(12) United States Patent
Jebely et al.

(10) Patent No.: US 10,654,205 B2
(45) Date of Patent: May 19, 2020

(54) INJECTION MOLDING APPARATUS, METHOD, AND SYSTEM

(71) Applicant: Cap-Thin Molds Inc., Mississauga (CA)

(72) Inventors: Cyrus Jebely, Mississauga (CA); Vasko Dimitrov Vassilev, Mississauga (CA)

(73) Assignee: CAP-THIN MOLDS INC., Mississauga (CA)

( * ) Notice: Subject to any disclaimer, the term of this patent is extended or adjusted under 35 U.S.C. 154(b) by 397 days.

(21) Appl. No.: 15/067,509

(22) Filed: Mar. 11, 2016

(65) Prior Publication Data

US 2016/0263795 A1    Sep. 15, 2016

Related U.S. Application Data

(60) Provisional application No. 62/132,312, filed on Mar. 12, 2015.

(51) Int. Cl.
| | |
|---|---|
| *B29C 45/40* | (2006.01) |
| *B29C 45/76* | (2006.01) |
| *B29C 45/80* | (2006.01) |
| *B29C 45/36* | (2006.01) |
| *B29C 45/26* | (2006.01) |

(Continued)

(52) U.S. Cl.
CPC ........ *B29C 45/4005* (2013.01); *B29C 33/446* (2013.01); *B29C 45/006* (2013.01); *B29C 45/262* (2013.01); *B29C 45/36* (2013.01); *B29C 45/7626* (2013.01); *B29C 45/80* (2013.01); *B29C 2045/363* (2013.01); *B29C 2945/76568* (2013.01); *B29C 2945/76722* (2013.01); *B29C 2945/76896* (2013.01)

(58) Field of Classification Search
CPC . B29C 45/7626; B29C 45/4005; B29C 45/36; B29C 45/80; B29C 33/446; B29C 2045/363; B29C 2945/76568; B29C 2945/76722; B29C 2945/76896
See application file for complete search history.

(56) References Cited

U.S. PATENT DOCUMENTS

| | | | |
|---|---|---|---|
| 4,340,352 A  * | 7/1982 | Hayberg | ............. B29C 37/0014 249/58 |
| 5,744,082 A | 4/1998 | Bak et al. | |

(Continued)

*Primary Examiner* — Michael M. Robinson
(74) *Attorney, Agent, or Firm* — Bereskin & Parr LLP/S.E.N.C.R.L., S.R.L.

(57) ABSTRACT

A mold apparatus for producing a molded article by injection molding includes (a) a base plate for mounting to a platen of an injection molding machine; (b) a core plate movably coupled to the base plate and axially translatable relative to the base plate between a plate advanced position and a plate retracted position; (c) a lead screw rotatably supported by, and axially fixed relative to, the base plate; and (d) a lead nut coupled to the lead screw and rotationally fixed relative to the core plate. The lead nut is translatable in response to rotation of the lead screw between a first and a second abutment surface fixed relative to the core plate. The lead nut alternately bears against the first abutment surface for moving the core plate to the plate advanced position and the second abutment surface for moving the core plate to the plate retracted position.

25 Claims, 25 Drawing Sheets

(51) Int. Cl.
    *B29C 45/00*        (2006.01)
    *B29C 33/44*        (2006.01)

(56) References Cited

U.S. PATENT DOCUMENTS

| | | | |
|---|---|---|---|
| 6,811,391 B1 * | 11/2004 | Klaus | B29C 45/4005 425/556 |
| 7,470,387 B2 | 12/2008 | Chiu | |
| 2004/0199579 A1 | 10/2004 | Straw | |
| 2004/0222559 A1 | 11/2004 | Gomes et al. | |
| 2006/0263470 A1 * | 11/2006 | Vanderploeg | B29C 37/0007 425/593 |
| 2010/0166909 A1 * | 7/2010 | Mizutani | B29C 45/6728 425/595 |

* cited by examiner

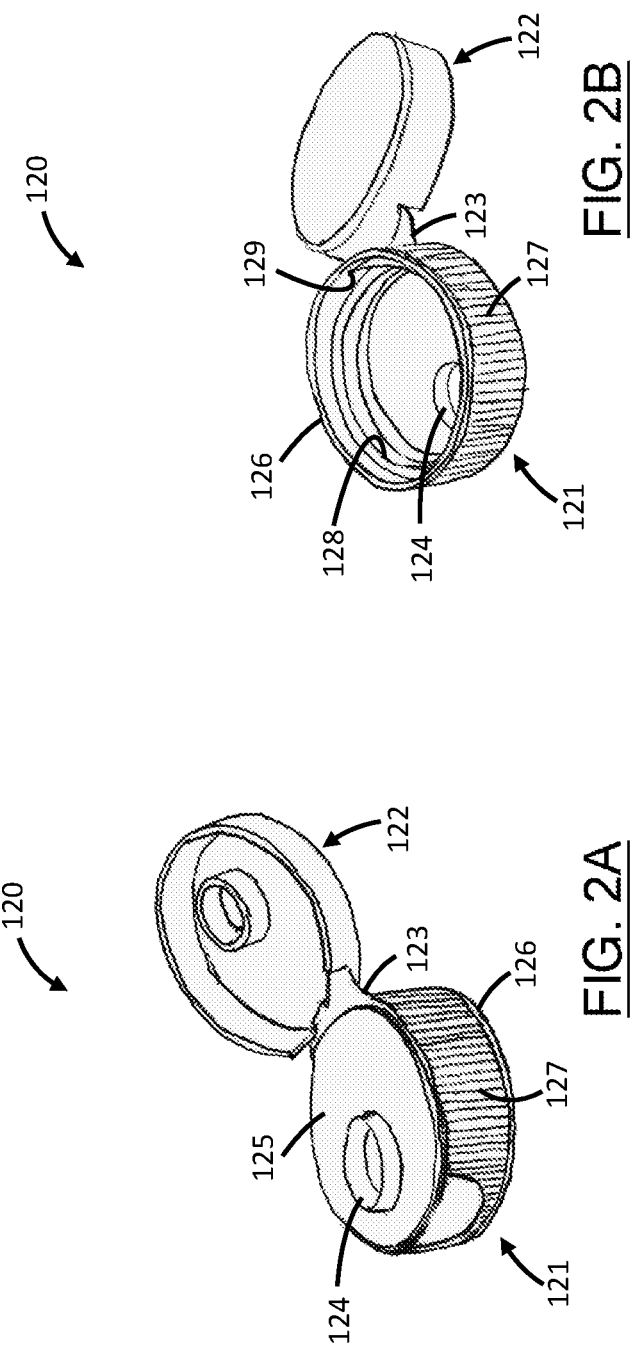

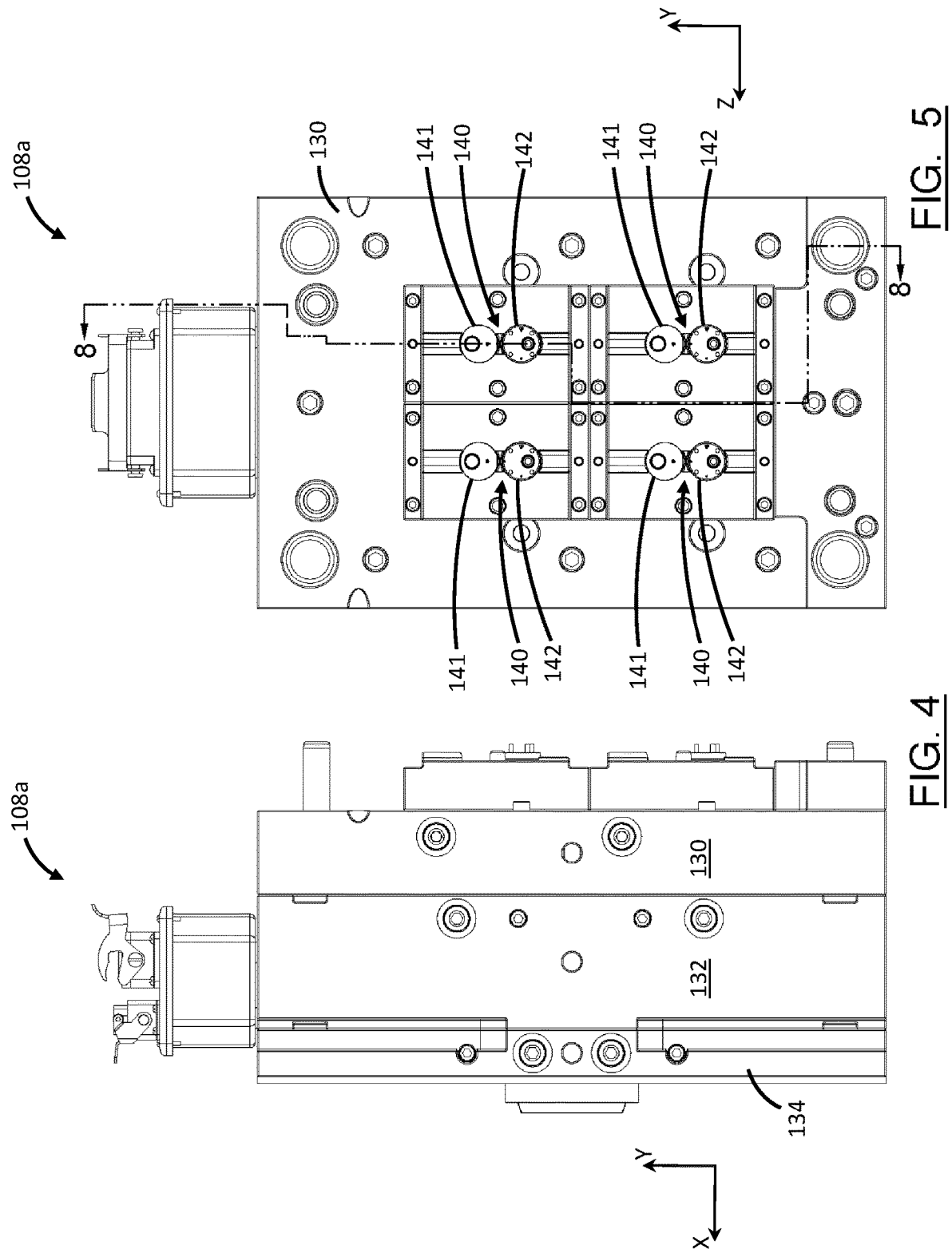

INJECTION MOLDING APPARATUS, METHOD, AND SYSTEM

This application claims the benefit of Provisional Application Ser. No. 62/132,312, filed Mar. 12, 2015, which is hereby incorporated herein by reference.

FIELD

The present disclosure relates to injection molding.

BACKGROUND

U.S. Pat. No. 5,744,082 describes a mold for forming and closing the one piece flip-top cap prior to ejection from the mold including a first mold part, an inner core mold part and a second mold part movable into relationship with the first mold part and the inner core mold so as to form a mold cavity therebetween. The mold produces a one piece flip-top cap with a living hinge between the body and lid of the cap and which is maintained in a closed position upon ejection from the mold.

United States Publication No. 2004/0222559 describes a mechanism for folding plastic injection molded parts after the parts have been molded and while the parts are still on the mold core half. The mechanism consists of a mold core half having one or more mold cores. The mold core half has a finger movably mounted adjacent the mold core half and movable along a predetermined path between a first position wherein the finger is clear of the mold core and a second position wherein the finger bears against the part on the mold core so as to fold the part.

U.S. Pat. No. 7,470,387 describes a laterally movable lifting arm and follower which may be mounted adjacent a mold. The lifting arm is movable from a cap engaging position wherein it initially moves the cap away from the mold into the path of the follower. The cap is initially moved across the lid by lateral movement of the lifting arm. The follower is subsequently passed across the cap to lockingly engage the closure.

SUMMARY

The following summary is intended to introduce the reader to various aspects of the applicant's teaching, but not to define any invention.

According to one aspect of the teachings disclosed herein, a mold apparatus for producing a molded article by injection molding includes: (a) a base plate for mounting to a platen of an injection molding machine; (b) a core plate movably coupled to the base plate and axially translatable relative to the base plate between a plate advanced position and a plate retracted position; (c) a lead screw rotatably supported by, and axially fixed relative to, the base plate; and (d) a lead nut coupled to the lead screw and rotationally fixed relative to the core plate. The lead nut is translatable in response to rotation of the lead screw between a first and a second abutment surface fixed relative to the core plate. The lead nut alternately bears against the first abutment surface for moving the core plate to the plate advanced position and the second abutment surface for moving the core plate to the plate retracted position.

In some examples, the lead nut includes a first force-transfer surface directed toward and engageable with the first abutment surface and a second force-transfer surface directed toward and engageable with the second abutment surface.

In some examples, the lead nut includes a head having a radially outwardly extending flange with axially opposed faces. The axially opposed faces can include the first and second force-transfer surfaces, respectively.

In some examples, the lead nut includes a first anti-rotate surface engaging a second anti-rotate surface rotationally fixed relative to the core plate to rotationally fix the lead nut relative to the core plate.

In some examples, the lead nut includes a body extending axially away from the head. The body can include the first anti-rotate surface.

In some examples, the core plate includes a socket receiving the body of the lead nut.

In some examples, the core plate includes an annular collar fixed to the core plate. The collar can have an end face including the second abutment surface and an inner surface including the second anti-rotate surface.

In some examples, the apparatus further includes: (a) a core first portion rotatably supported by the base plate, the core first portion including a thread mold for forming internal threads of an article first portion of the molded article; and (b) a core second portion fixed relative to the core plate. The core second portion can be for forming an article second portion of the molded article. The core plate can be translatable relative to the core first portion, and the core first portion can be rotatable relative to the core second portion.

In some examples, during an ejection phase, rotation of the core first portion relative to the core second portion is synchronized with translation of the core plate for unscrewing the core first portion from the article first portion without damaging the internal threads.

In some examples, during the ejection phase the core plate is translatable toward the plate advanced position at a translation rate equal to a lead of the thread mold multiplied by a rotation rate of the core first portion relative to the core second portion.

In some examples, the thread mold and the lead screw have an equal lead.

In some examples, the apparatus further includes a first motor operable to simultaneously rotate the lead screw and the core first portion.

In some examples, the apparatus further includes a clutch operable in an adjustment mode to decouple the first motor and the lead screw so that the core first portion is rotatable by the first motor while the core plate remains axially fixed relative to the base plate.

In some examples, when the clutch is in the adjustment mode, the first motor is operable to rotate the core first portion to adjust a rotational home position of the core first portion while the core plate remains axially fixed relative to the base plate. The rotational home position can be defined by an angular position of a thread start of the thread mold about an axis of rotation of the core first portion and relative to the core second portion.

In some examples, the clutch includes an electromagnetic clutch.

In some examples, the first motor can be a first servomotor.

In some examples, the apparatus further includes a manipulation mechanism coupled to the core plate. The manipulation mechanism can include an engagement member for moving the article second portion relative to the article first portion.

In some examples, the engagement member is movable relative to the core plate among an engagement-member retracted position in which the engagement member is clear of the core first portion and the core second portion, an engagement-member intermediate position in which the engagement member overlies the core second portion, and an engagement-member advanced position in which the engagement member overlies the core first portion.

In some examples, when the core plate is in the plate retracted position, the core first portion is translatable relative to the core second portion from a core-first-portion retracted position to a core-first-portion advanced positon in which the core first portion is positioned axially forward of the core second portion for creating an axial gap between the core second portion and the article second portion. The engagement member can be insertable into the gap when moved from the engagement-member retracted position to the engagement-member intermediate position.

In some examples, the core first portion is translatable from the core-first-portion advanced position to the core-first-portion retracted position when the core plate is in the retracted position and the engagement member is in the engagement-member intermediate position for moving the article second portion relative to the article first portion from an open position toward a closed position.

In some examples, the engagement member is movable from the engagement member intermediate position to the engagement member advanced position for moving the article second portion to a fully closed position relative to the article first portion.

In some examples, the core plate is translatable from the plate retracted position toward the plate advanced position during at least a portion of the movement of the engagement member from the engagement-member intermediate position to the engagement-member advanced position.

In some examples, the engagement member includes a roller for moving the article second portion relative to the article first portion, and the manipulation mechanism further includes a cam plate for guiding movement of the roller among the engagement-member retracted position, the engagement-member intermediate position, and the engagement-member advanced position.

In some examples, the manipulation mechanism further includes a second motor operable to move the engagement member among the engagement-member retracted position, the engagement-member intermediate position, and the engagement-member advanced position.

In some examples, the second motor can be a second servomotor.

According to some aspects of the teachings disclosed herein, a method of resetting a core plate of a mold apparatus of an injection molding machine includes: (a) energizing a mechanical actuator in a retraction direction to exert a retraction force against the core plate and axially translate the core plate relative to a base plate from a plate advanced position associated with ejecting a molded article from the mold to a plate retracted position associated with injecting melt into the mold, the base plate for mounting to a platen of the injection molding machine; and (b) after step (a) and prior to applying clamping tonnage, relieving the retraction force to axially unload the mechanical actuator, wherein the actuator is isolated from axial force exerted across the mold during application of the clamping tonnage.

In some examples, the actuator includes a lead nut coupled to a lead screw and rotationally fixed relative to the core plate, and the step of relieving the retraction force includes axially translating the lead nut relative to the core plate in a direction opposite the retraction direction.

In some examples, the lead nut is translatable relative to the core plate between a nut advanced positon in which the lead nut bears against a first abutment surface fixed relative to the core plate for moving the core plate to the plate advanced position, and a nut retracted position in which the lead nut bears against a second abutment surface fixed relative to the core plate for moving the core plate to the plate retracted position, and relieving the retraction force can include translating the lead nut away from the second abutment surface toward the first abutment surface.

In some examples, the method further includes the step of applying the clamping tonnage while the lead nut is in a home position between the nut retracted position and the nut advanced position.

In some examples, the step of relieving the retraction force includes operating a servomotor to rotate the lead screw.

According to one aspect of the teaching disclosed herein, a method for manipulating a molded article produced by injection molding, the molded article having an article first portion and an article second portion, includes: (a) operating a first servomotor to advance a core second portion relative to a base plate, the core second portion for forming the article second portion and the base plate mountable to a platen of an injection molding machine; and (b) operating a second servomotor to move an engagement member along a path from an engagement-member intermediate position to an engagement-member advanced position to move the article second portion from a partially closed position to a fully closed position relative to the article first portion.

In some examples, in the engagement-member intermediate position the engagement member overlies the core second portion and in the engagement-member advanced position the engagement member overlies a core first portion for forming the article first portion.

In some examples, the engagement member is moved along a first portion of the path while the core second portion is advancing relative to the base plate.

In some examples, the engagement member is moved a first time along a first portion of the path that includes the engagement-member advanced position prior to ejection of the molded article.

In some examples, the engagement member is moved a second time along the first portion of the path prior to ejection of the molded article.

In some examples, the engagement member is moved along the first portion of the path the first time and the second time while the core second portion is advancing relative to the base plate.

In some examples, the method further includes the step of operating the first servomotor to rotate the core first portion relative to the core second portion. The core first portion can include a thread mold for forming internal threads of the article first portion.

In some examples, the method further includes the step of synchronizing rotation of the core first portion relative to the core second portion with advancement of the core second portion relative to the core first portion to unscrew the core first portion from the article first portion without damaging the internal threads.

In some examples, the step of synchronizing includes operating the first servomotor to advance the core second portion relative to the core first portion at a translation rate equal to a lead of the thread mold multiplied by a rotation rate of the core second portion relative to the core first portion.

In some examples, the method further includes the step of decoupling the first servomotor and the core second portion, and after the step of decoupling, operating the first servomotor to rotate the core first portion relative to the core second portion while the core second portion remains axially fixed relative to the base plate.

In some examples, the method further includes, after the step of decoupling, operating the first servomotor to adjust a rotational home position of the core first portion while the core second portion remains axially fixed relative to the base plate. The rotational home position can be defined by an angular position of a thread start of the thread mold about an axis of rotation of the core first portion.

According to one aspect of the teaching disclosed herein, a system for producing a molded article by injection molding, the molded article having an article first portion and an article second portion, includes: (a) a base plate for mounting to a platen of an injection molding machine; (b) a core plate movably coupled to the base plate; (c) a core second portion mounted to the core plate for forming the article second portion; (d) a drive mechanism including a mechanical actuator coupled to the core plate, and a first servomotor for operating the actuator to translate the core plate relative to the base plate between a plate advanced position and a plate retracted position; (e) a manipulation mechanism coupled to the core plate, the manipulation mechanism including an engagement member and a second servomotor for moving the engagement member along a path to move the article second portion relative to the article first portion; and (f) a controller configured to (i) operate the first servomotor to translate the core plate between the plate advanced position and the plate retracted position, and (ii) operate the second servomotor to move the engagement member along the path.

In some examples, the controller is configured to operate the first servomotor during an ejection phase to translate the core plate between the plate advanced position and the plate retracted position while operating the second servomotor to move the engagement member along the path.

In some examples, the controller is configured to operate the first servomotor during the ejection phase to translate the core plate from the plate retracted position to the plate advanced position while operating the second servomotor to move the engagement member along a first portion of the path a first time prior to ejection of the molded article.

In some examples, the controller is configured to operate the first servomotor during the ejection phase to move the engagement member along the first portion of the path a second time prior to ejection of the molded article.

In some examples, the system further includes a core first portion rotatably supported by the base plate. The core first portion can include a thread mold for forming internal threads of the article first portion. The controller can be configured to operate the first servomotor to rotate the core first portion.

In some examples, the drive mechanism further includes a clutch coupling the first servomotor and the actuator, and the controller is configured to operate the clutch in an adjustment mode to decouple the first servomotor and the actuator and operate the first servomotor when the clutch is in the adjustment mode to rotate the core first portion while the core plate remains axially fixed relative to the base plate.

In some examples, the controller is configured to operate the first servomotor when the clutch is in the adjustment mode to adjust a rotational home position of the core first portion while the core plate remains axially fixed relative to the base plate. The rotational home position can be defined by an angular position of a thread start of the thread mold about an axis of rotation of the core first portion.

According to one aspect of the teaching disclosed herein, an apparatus for producing a molded article by injection molding includes: (a) a base plate for mounting to a platen of an injection molding machine; (b) a core plate movably coupled to the base plate; (c) a mechanical actuator coupled to the core plate for translating the core plate relative to the base plate between a plate advanced position and a plate retracted position; (d) a core first portion rotatably coupled to the base plate, the core first portion including a thread mold for forming internal threads of the molded article; (e) a first motor operable to rotate the core first portion relative to the core plate and energize the actuator to translate the core plate; and (f) a clutch coupling the first motor and the actuator, the clutch configured to operate in an adjustment mode to decouple the first motor and the actuator so that the core first portion is rotatable by the first motor while the core plate remains axially fixed relative to the base plate.

In some examples, when the clutch is in the adjustment mode, the first motor is operable to adjust a rotational home position of the core first portion while the core plate remains axially fixed relative to the base plate. The rotational home position can be defined by an angular position of a thread start of the thread mold about an axis of rotation of the core first portion.

According to one aspect of the teaching disclosed herein, a method of operating an injection molding system includes: (a) operating a motor to axially translate a core second portion relative to a base plate, the core second portion for forming a portion of the molded article and the base plate for mounting to an injection molding machine; (b) during step (a), operating the motor to rotate a core first portion relative to the core second portion, the core first portion including a thread mold for forming internal threads of the molded article; (c) after step (b), decoupling the motor and the core second portion; and (d) after step (c), operating the motor to rotate the core first portion relative to the core second portion while the core second portion remains axially fixed relative to the base plate.

In some examples, step (d) further includes operating the motor to adjust a rotational home position of the core first portion, the rotational home position defined by an angular position of a thread start of the thread mold about an axis of rotation of the core first portion.

In some examples, the motor can be a servomotor.

BRIEF DESCRIPTION OF THE DRAWINGS

The drawings included herewith are for illustrating various examples of apparatuses, methods, and systems of the present disclosure and are not intended to limit the scope of what is taught in any way. In the drawings:

FIG. 2A is a top perspective view of an example molded article manufactured by the injection molding machine of FIG. 1A;

FIG. 2B is a bottom perspective view of the molded article of FIG. 2A;

FIG. 4 is a side elevation view, as viewed from the non-operator side, of a cavity-half mold apparatus of the injection molding machine of FIG. 1A;

FIG. 5 is a front view of the cavity-half mold apparatus of FIG. 4;

DETAILED DESCRIPTION

Various apparatuses, methods, or systems will be described below to provide an example of an embodiment of each claimed invention. No embodiment described below limits any claimed invention and any claimed invention may cover apparatuses, methods, and systems that differ from those described below. The claimed inventions are not limited to apparatuses, methods, and systems having all of the features of any one apparatus, method, or system described below or to features common to multiple or all of the apparatuses, methods, or systems described below. It is possible that an apparatus, method, or system described below is not an embodiment of any claimed invention. Any invention disclosed in an apparatus, method, or system described below that is not claimed in this document may be the subject matter of another protective instrument, for example, a continuing patent application, and the applicants, inventors, and/or owners do not intend to abandon, disclaim, or dedicate to the public any such invention by its disclosure in this document.

Figure 1A:
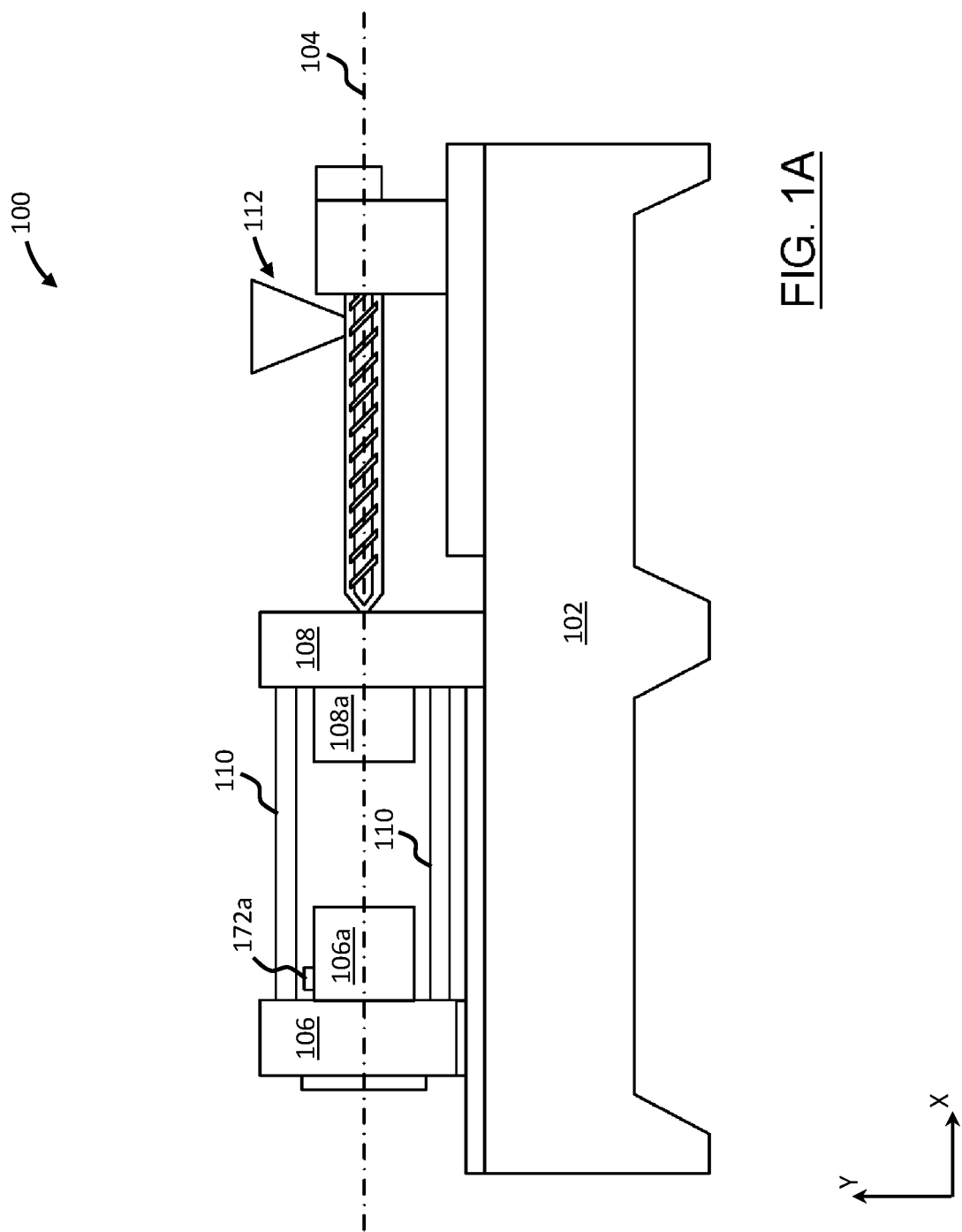
FIG. 1A is a side elevation view, as viewed from the operator side, of an example injection molding machine in a mold-open position.

Referring to FIG. 1A, an exemplary injection molding machine 100 includes a machine base 102 that extends lengthwise along a machine axis 104. A pair of platens, including a first platen 106 and a second platen 108, are supported by the machine base 102 for carrying respective half mold apparatuses 106a, 108a of a mold. At least one tie bar 110 extends generally between the first and second platens 106, 108 for coupling the platens together by exerting a clamp load across the platens when stretched. In the example illustrated, the injection molding machine 100 includes four tie bars 110.

In the example illustrated, the first platen 106 is also referred to as a moving platen, and the second platen is also referred to as a stationary platen. The first (moving) platen 106 can translate toward and away from the second (stationary) platen 108 along the machine axis 104 to close and open the mold. Any suitable platen actuator can be coupled to the moving platen 106 for advancing and retracting the moving platen 106 between mold-closed and mold-open positions. In some examples, the platen actuator can include a first ball screw driven by an electric motor.

Figure 1B:
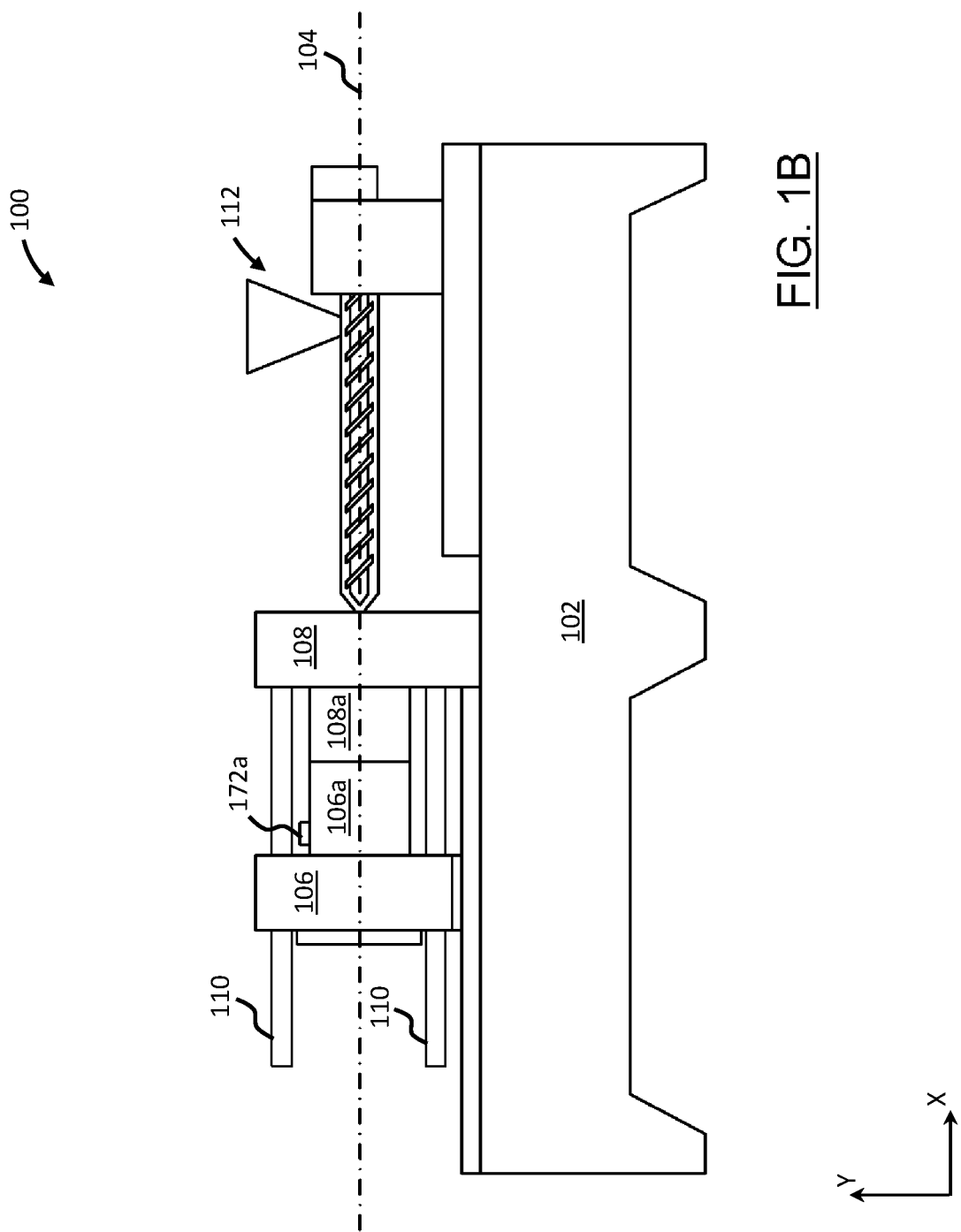
FIG. 1B is a side elevation view, as viewed from the operator side, of the injection molding machine of FIG. 1A in a mold-closed position.

When in the mold-open position (FIG. 1A), the core-half mold apparatus 106a (fixed to the moving platen 106) and the cavity-half mold apparatus 108a (fixed to the stationary platen 108) are axially spaced apart from each other. When in the mold-closed position (FIG. 1B), the core-half mold apparatus 106a and the cavity-half mold apparatus 108a are in contact with each other and form at least one enclosed cavity to be filled with plastic melt (e.g., from an injection unit 112) for forming an injection molded article. In the example illustrated, the mold is a four-cavity mold, providing four enclosed cavities when closed for producing four molded articles in each injection molding cycle of the injection molding machine 100.

In some examples, molded articles to be formed by the injection molding machine 100 may have an article first portion and an article second portion that is connected with, and movable relative to, the article first portion. After melt has been injected into the cavities and cooled sufficiently, it may be desirable to manipulate one of the portions relative to the other prior to ejecting the article out of the mold.

For example, with reference to FIG. 2A, in the example illustrated the molded article 120 formed by the injection molding machine 100 is a flip-top lid having an article first portion 121 in the form of a closure body with a dispensing orifice 124, and an article second portion 122 in the form of a cap that can engage the closure body to seal closed the dispensing orifice 124. The article first portion 121 and the article second portion 122 are joined together by a living hinge 123. The hinge 123 is integrally formed with the article first portion 121 and the article second portion 122, and allows the article second portion 122 to pivot relative to the article first portion 121 to open and close the dispensing orifice 124.

In the example illustrated, the hinge 123 further serves as an optional biasing member to alternately bias the article second portion 122 between a biased-open position and a biased-closed position.

Figure 3C:
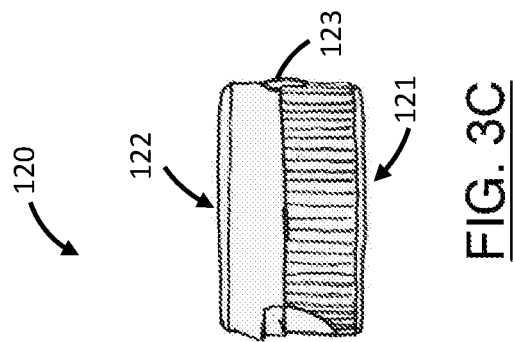
FIG. 3C is a side elevation view of the molded article of FIG. 2A in a fully-closed position.
Figure 3B:
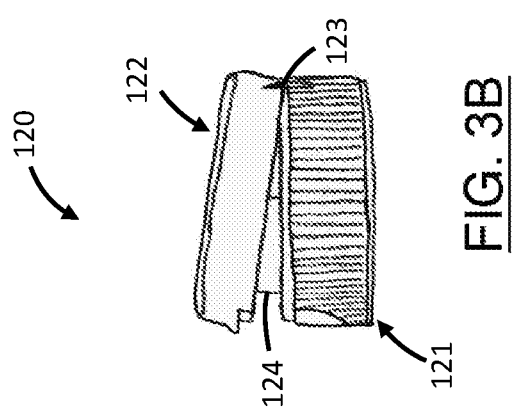
FIG. 3B is a side elevation view of the molded article of FIG. 2A in a biased-closed position.
Figure 3A:
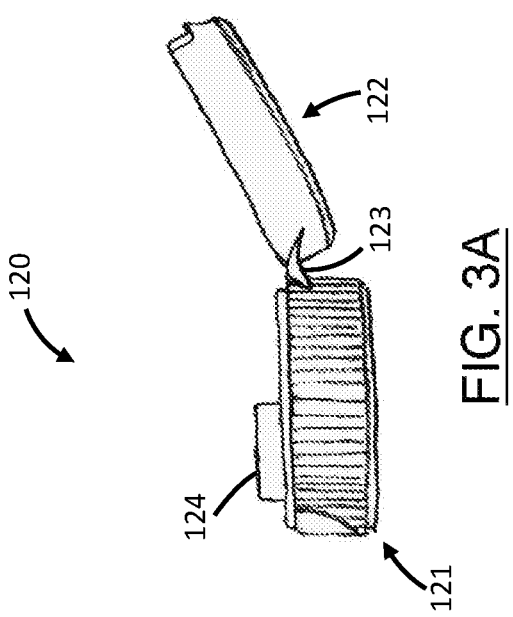
FIG. 3A is a side elevation view of the molded article of FIG. 2A in a biased-open position.

Referring to FIG. 3A, the molded article 120 is shown in a biased-open position, in which the hinge 123 acts to bias the article second portion 122 at an obtuse angle relative to the article first portion 121. The molded article 120 can be manipulated into a biased-closed position by pivoting the article second portion 122 toward the article first portion 121 about the hinge 123. After the article second portion 122 is pivoted with sufficient force to overcome the open position bias of the hinge 123, the hinge 123 acts to bias the article second portion 122 into the biased-closed position shown in FIG. 3B, in which the article second portion 122 rests at an acute angle relative to the article first portion 121. The molded article 120 can then be manipulated into the fully closed position shown in FIG. 3C by pressing the article second portion 122 against the article first portion 121. A snap-fit configuration between portions of the article first portion 121 and portions of the article second portion 122 can retain the molded article 120 in the fully-closed portion.

In the example illustrated, the injection molding machine 100 is configured to mold the molded article 120 in an open position, and to manipulate the molded article 120 into the fully-closed position prior to ejection of the molded article from the mold.

Referring back to FIG. 2A, in the example illustrated, the article first portion 121 includes a top surface 125 and a skirt 126 extending downwardly from the periphery of the top surface 125. The top surface 125 includes the dispensing orifice 124. The dispensing orifice 124 is radially offset from the center of the top surface 125 in a direction opposite to and away from the circumferential position of the hinge 123. The outer surface of the skirt 126 includes a plurality of ribs 127 extending circumferentially about the skirt 126, with each rib 127 oriented perpendicular to the top surface 125.

Referring to FIG. 2B, the interior surface of the article first portion 121 includes an internally threaded surface extending along the inner surface of the skirt 126. The internally threaded surface is configured to cooperate with an externally threaded surface on a container on which the molded article 120 is to be installed.

In the example illustrated, the internally threaded surface comprises a helical internal thread 128 having a thread start 129 adjacent the edge of the skirt 126 spaced away from the top surface 125. The circumferential position of the thread start relative to the hinge 123 and/or dispensing orifice 124 can impact the circumferential position of the hinge 123 and/or dispensing orifice 124 of the molded article 120 when fully installed on a threaded container.

In the example illustrated, the thread start 129 is circumferentially oriented to align with the middle of the hinge 123. In other examples, the thread start 129 may be offset from the middle of the hinge 123 (or relative to any other reference point of the molded article 120) by a user-specified amount (e.g., 45 degrees, 70 degrees, 180 degrees, etc.).

Maintaining a consistent orientation of the thread start 129 for each molded article 120 may ensure proper alignment of the dispensing orifice 124 and the hinge 123 relative to containers onto which the molded articles 120 will be installed. For instance, the molded article 120 may be installed onto a container having a handle to assist in pouring liquid contents out of the container. In such examples, the thread start 129 can be circumferentially oriented to cooperate with the threading of the container, such that when the molded article 120 is threaded onto the container and in a biased-open position, the article second portion 122 will project outwardly toward the handle of the container (i.e., in the opposite direction of where the contents of the container will be poured), so that the article second portion 122 does not obstruct the flow of liquids from the container through the dispensing orifice 124.

Referring to FIG. 4, an example of the cavity-half mold apparatus 108a is shown as viewed from the non-operator side of the injection molding machine 100. In the example illustrated, the cavity-half mold apparatus 108a includes a cavity plate 130 supported on a manifold plate 132. The manifold plate 132 is supported on a cavity base plate 134, which is used for mounting the cavity-half mold apparatus 108a to the second (stationary) platen 108.

Referring to FIG. 5, the cavity plate 130 supports a number of cavity portions 140 for forming portions of the molded article 120. In the example illustrated, each cavity portion 140 includes a cavity first portion 141 and a cavity second portion 142. Each cavity first portion 141 is shaped to form the top surface 125, the dispensing orifice 124, and a portion of the exterior ribbed surface of the skirt 126 of the article first portion 121. Each cavity second portion 142 is shaped to form the interior surface of the hinge 123, as well as the interior surface of the article second portion 122.

In the example illustrated, the cavity-half mold apparatus 108a includes four cavity portions 140 arranged in two rows and two columns for forming four molded articles 120 during each injection molding cycle. In other examples, the particular arrangement may be varied to include any number of rows and columns of cavity portions 140, to form fewer or more molded articles 120 during each injection molding cycle.

Figure 6:
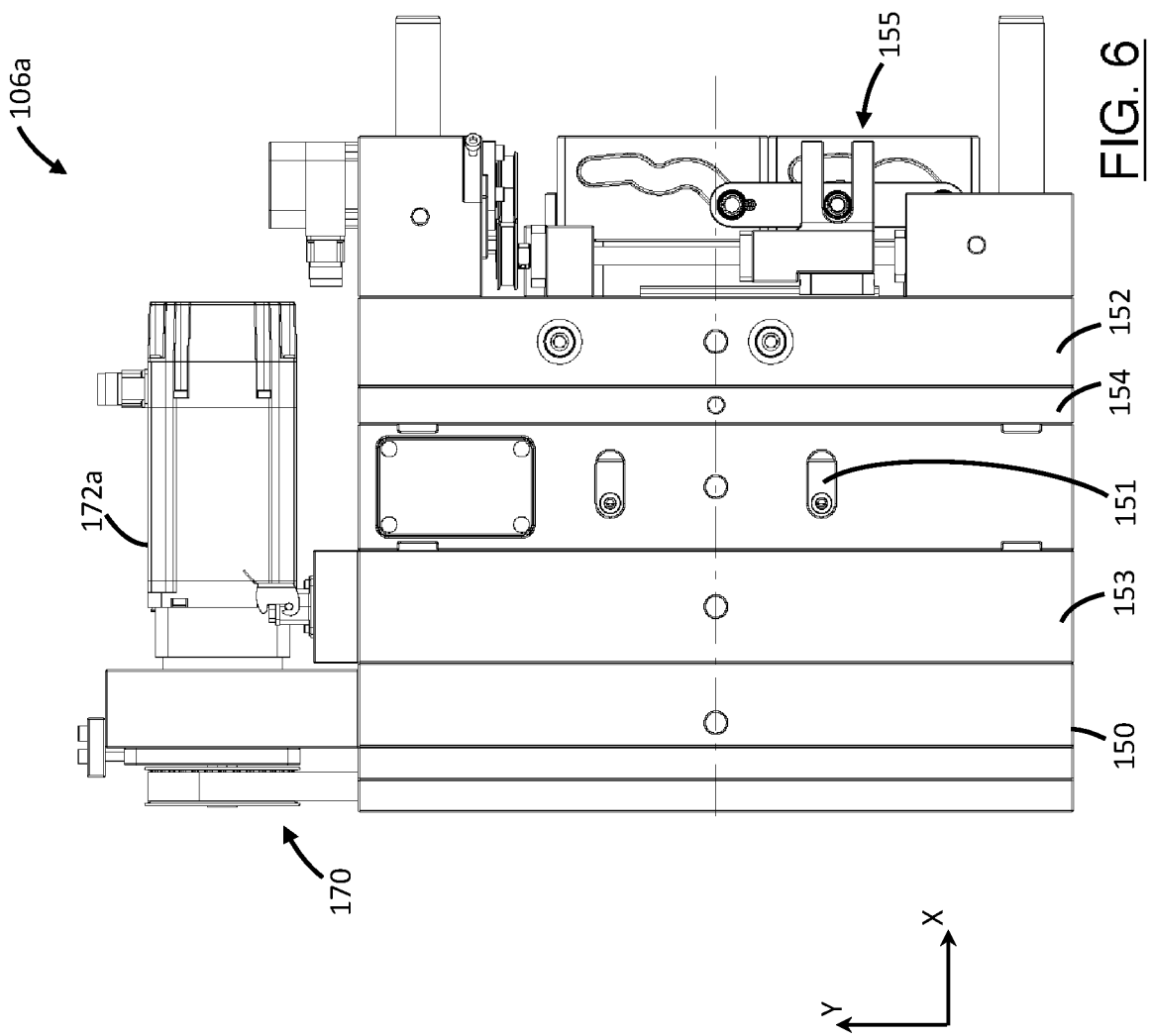
FIG. 6 is a side elevation view, as viewed from the operator side, of a core-half mold apparatus of the injection molding machine of FIG. 1A.

Referring to FIG. 6, an example of the core-half mold apparatus 106a is shown as viewed from the operator side of the injection molding machine 100. In the example illustrated, the core-half mold apparatus 106a includes a core base plate 150 for mounting the core-half mold apparatus 106a to the first (moving) platen 106.

Figure 8:
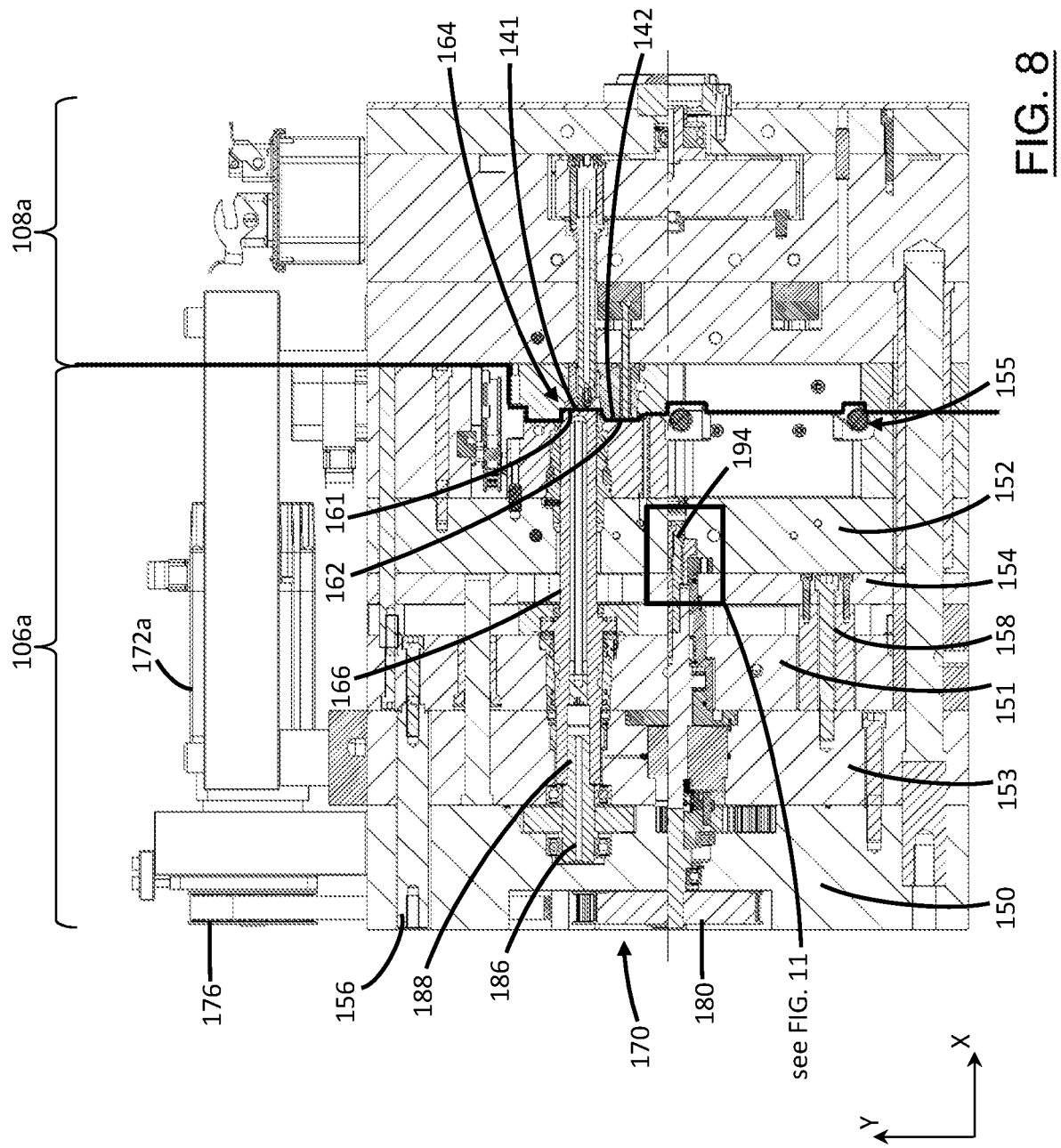
FIG. 8 is an enlarged view of the core-half mold apparatus and the cavity-half mold apparatus of FIG. 1B, shown in a sectional view taken along the lines 8-8 in FIG. 7 and in FIG. 5, respectively.
Figure 19:
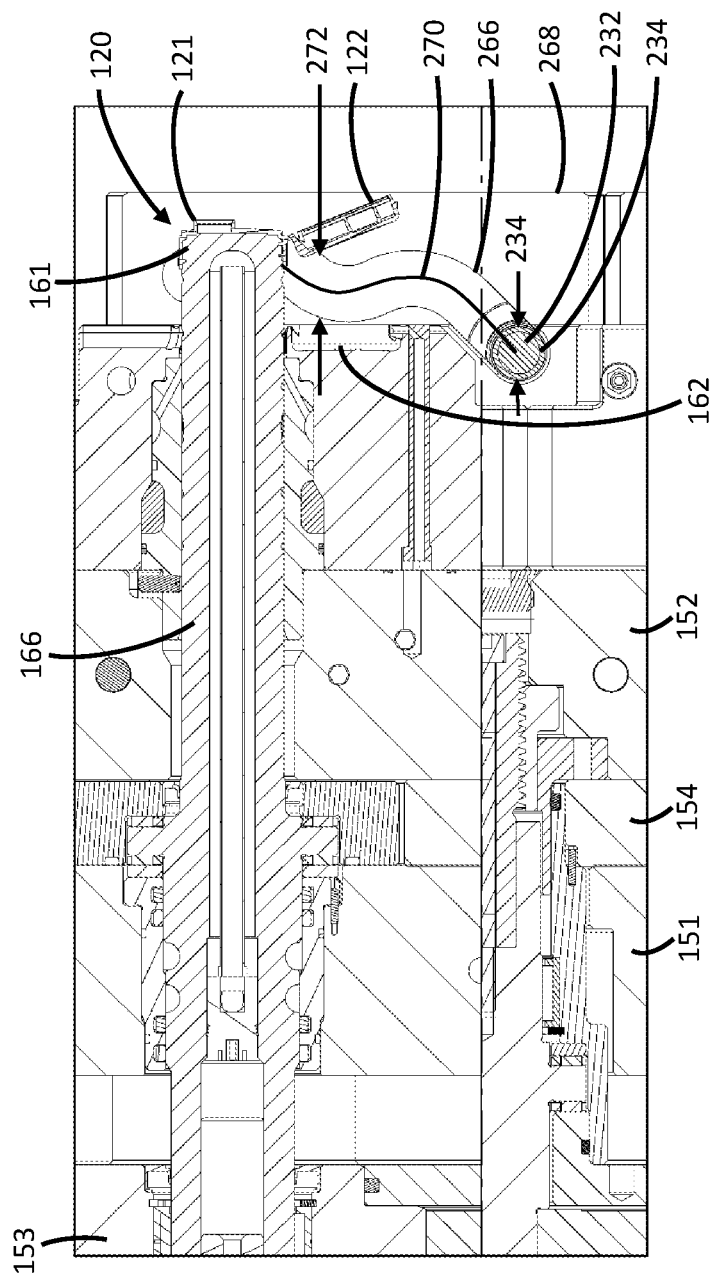
FIG. 19 is a portion of the core-half mold apparatus of FIG. 8, with a first core plate and a first core portion in an advanced position, a second core plate and a second core portion in a retracted position, and an engagement member in a retracted position.

In the example illustrated, a first core plate 151 is positioned forward of and movably coupled to the base plate 150. The first core plate 151 is axially translatable relative to the base plate 150 between a first-plate advanced position and a first-plate retracted position. In the first-plate retracted position, the first core plate 151 abuts a first stationary back plate 153 positioned between the first core plate 151 and the base plate 150 (as shown in FIG. 8). In the first-plate advanced position, the first core plate 151 abuts a second stationary back plate 154 positioned forward of the first core plate 151, and is spaced apart from the first back plate 153 (as shown in FIG. 19). The first and second back plates 153, 154 are fixed to one another through support pillars 158

(FIG. 8) and to the base plate 150, and operate as hard stops for transferring clamping tonnage across the core-half mold apparatus 106a.

Figure 22:
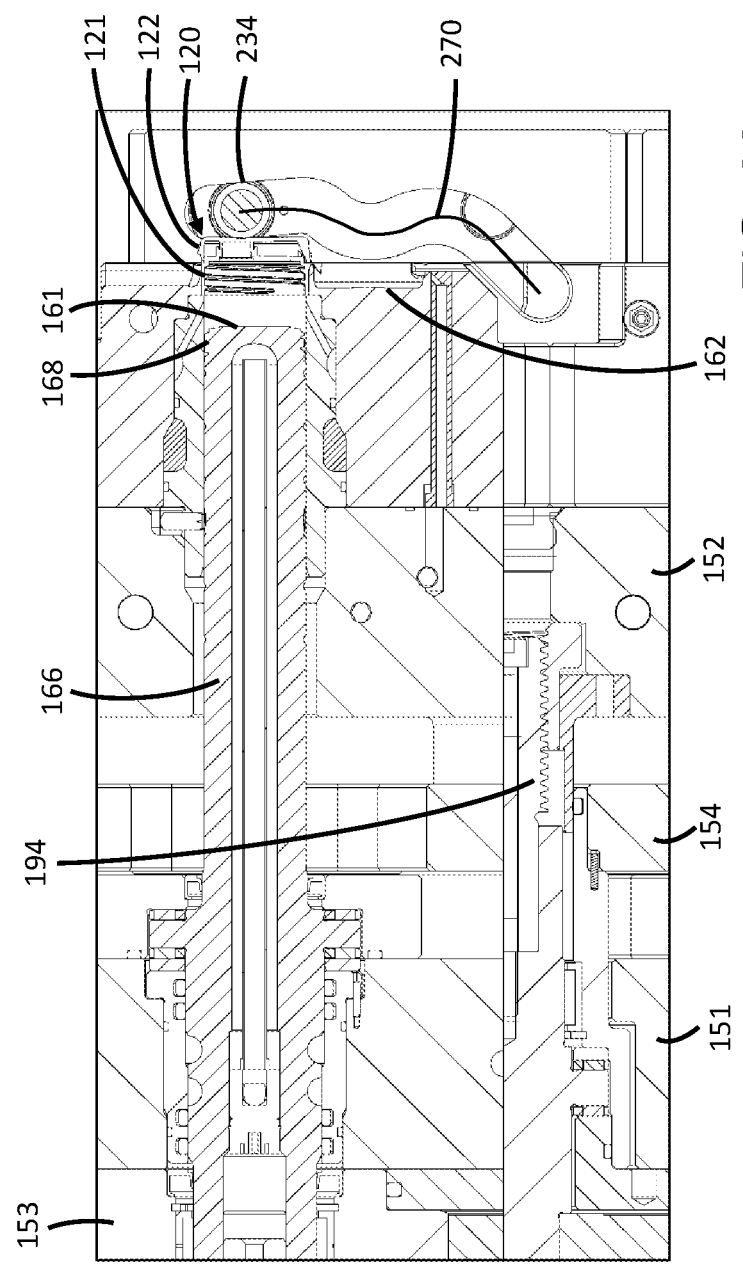
FIG. 22 is the portion of the core-half mold apparatus of FIG. 19, with the first core plate and the first core portion in a retracted position, the second core plate and the second core portion in an advanced position, and the engagement member in an advanced position.

In the example illustrated, a second core plate 152 is positioned forward of the second back plate 154. A manipulation mechanism 155 is mounted to the forward face of the second core plate 152. The second core plate 152 is also movably coupled to the base plate 150, and is axially translatable relative to the base plate 150 between a second-plate advanced position and a second-plate retracted position. In the second-plate retracted position, the second core plate 152 abuts the second back plate 154 (as shown in FIG. 8). In the second-plate advanced position, the second core plate 152 is moved forward and is spaced apart from the second back plate 154 (as shown in FIG. 22). The first core plate 151 and the second core plate 152 are translatable relative to the base plate 150 independent of one another.

Figure 7:
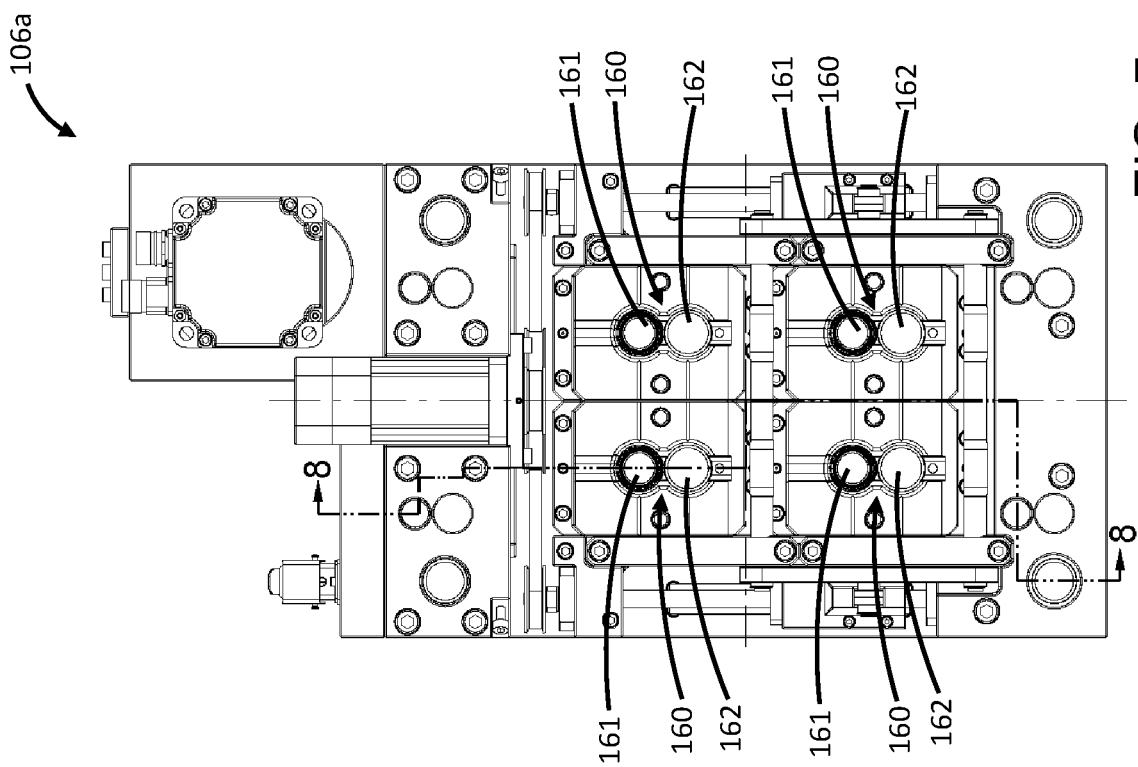
FIG. 7 is a front view of the core-half mold apparatus of FIG. 6.

Referring to FIG. 7, in the example illustrated, the second core plate 152 can support a number of core portions 160. The number of core portions 160 corresponds to the number of cavity portions 140. In the example illustrated, each core portion 160 includes a rotatable core first portion 161 and a non-rotatable core second portion 162. Each core first portion 161 includes a thread mold 168 (shown in FIG. 10) shaped to form the interior of the article first portion 121, including the internal threads 128. Each core second portion 162 is shaped to form the exterior surface of the hinge 123, as well as the exterior surface of the article second portion 122.

Referring to FIG. 8, the core-half mold apparatus 106a and the cavity-half mold apparatus 108a are shown as viewed from the operator side in the mold-closed position. In the mold-closed position, the first and second core plates 151, 152 are in respective retracted positions. In this position, clamping tonnage applied across the first and second platens 106, 108 is transferred from the second core plate 152 to the base plate 150 through the second back plate 154, the support pillars 158, and the first back plate 153.

In the mold-closed position, the cavity portions 140 cooperate with the core portions 160 to form a mold cavity 164 for forming the molded article 120. Specifically, each cavity first portion 141 cooperates with each core first portion 161 to form a portion of the mold cavity 164 for forming the article first portion 121. Each cavity second portion 142 cooperates with each core second portion 162 to form a portion of the mold cavity 164 for forming the article second portion 122.

Continuing to refer to FIG. 8, in the example illustrated, each core first portion 161 is fixed to a forward end of a rotatable core rod 166. In the example illustrated the core first portion 161 and the core rod 166 are integrally formed. The core rod 166 extends through and is rotatably supported by the first and second core plates 151, 152, and is rotatably coupled to the base plate 150 through a drive mechanism 170 fixed to the base plate 150. The drive mechanism 170 can operate to rotate the core rod 166 (and thus the core first portion 161) relative to the base plate 150, the first and second core plates 151, 152, and the core second portion 162.

Figure 9:
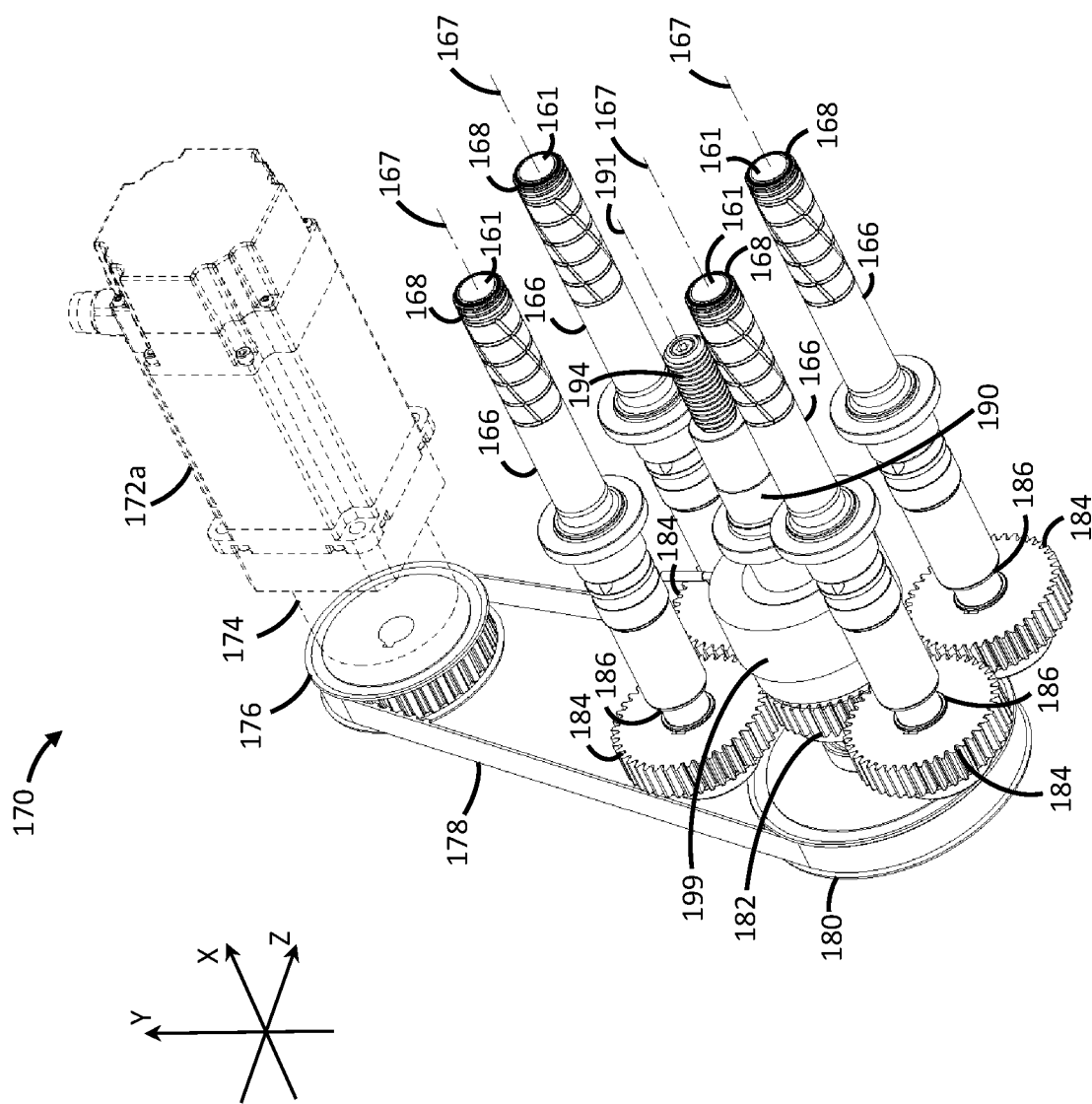
FIG. 9 is a perspective view of a drive mechanism of the core-half mold apparatus of FIG. 6.

Referring to FIG. 9, in the example illustrated, the drive mechanism 170 includes a first motor 172a for rotating the core rods 166 about respective core rod axes 167, which are parallel to the x-axis. As will be described in more detail below, the first motor 172a also operates to advance and retract the second core plate 152. The first motor 172a is a servomotor controllable through a first controller 173a (FIG. 25) to allow for precise control of the angular position and rotation rate of the core rods 166, as well as the axial position and translation rate of the second core plate 152.

In the example illustrated, the first motor 172a transmits torque through a gear box 174 to a first timing pulley 176. A timing belt 178 couples the first timing pulley 176 to a second timing pulley 180. The second timing pulley 180 drives a center gear 182, which in turn drives four spur gears 184 coupled to respective core rods 166. Each spur gear 184 is coupled to a respective core rod 166 through a core spindle 186.

Each spindle 186 includes a forward end 188 (FIG. 8) which is inserted into a bore at the rear end of the core rod 166. The forward end 188 can include an exterior torque transfer surface that engages and can axially translate relative to an interior torque transfer surface of a respective core rod 166, to transmit torque from the spur gear 184 to the core rod 166 (and thus the core first portion 161). In the example illustrated, the core rods 166 and the spindles 186 are coupled such that the core rods 166 can axially translate relative to the spindles 186 along the x-axis.

Referring back to FIG. 8, the core rods 166 are axially fixed to the first core plate 151. Thus, translation of the first core plate 151 between the first-plate advanced position and the first-plate retracted position translates the core rod 166 and the core first portion 161 between a core-first-portion advanced position and a core-first-portion retracted position, respectively, relative to the base plate 150 (and the spindles 186). As will be described in more detail below, during an ejection phase of the injection molding cycle—during which the mold is opened and the molded article 120 is manipulated and ejected—the core first portion 161 is translated to advance and retract the molded article 120 relative to the core second portion 162 to assist in its manipulation.

The first core plate 151 may be translated between the first-plate advanced and first-plate retracted positions by any suitable mechanism. In the example illustrated, the first core plate 151 can be advanced and retracted by movement of knockout rods 156 secured to rear of the first core plate 151. The knockout rods 156 may be driven by, for example, accessory pins of the first (movable) platen 106. In some examples, the accessory pins may take the place of ejector pins movably mounted to the rear of the first platen 106.

Continuing to refer to FIG. 8, in the example illustrated, each core second portion 162 is fixed to a forward end of the second core plate 152. Thus, translation of the second core plate 152 between the second-plate advanced position and the second-plate retracted position translates the core second portion 162 between a core-second-portion advanced position and a core-second-portion retracted position, respectively, relative to the base plate 150.

Referring to FIG. 9, in the example illustrated, the drive mechanism 170 operates to translate the second core plate 152 between the second-plate retracted position and the second-plate advanced position. In the example illustrated, the drive mechanism 170 includes a drive shaft 190 coupled to the center gear 182. The drive shaft 190 is driven by the first motor 172a about a drive axis 191. In the example illustrated, the drive axis 191 and the core rod axes 167 are parallel to one another.

Figure 10:
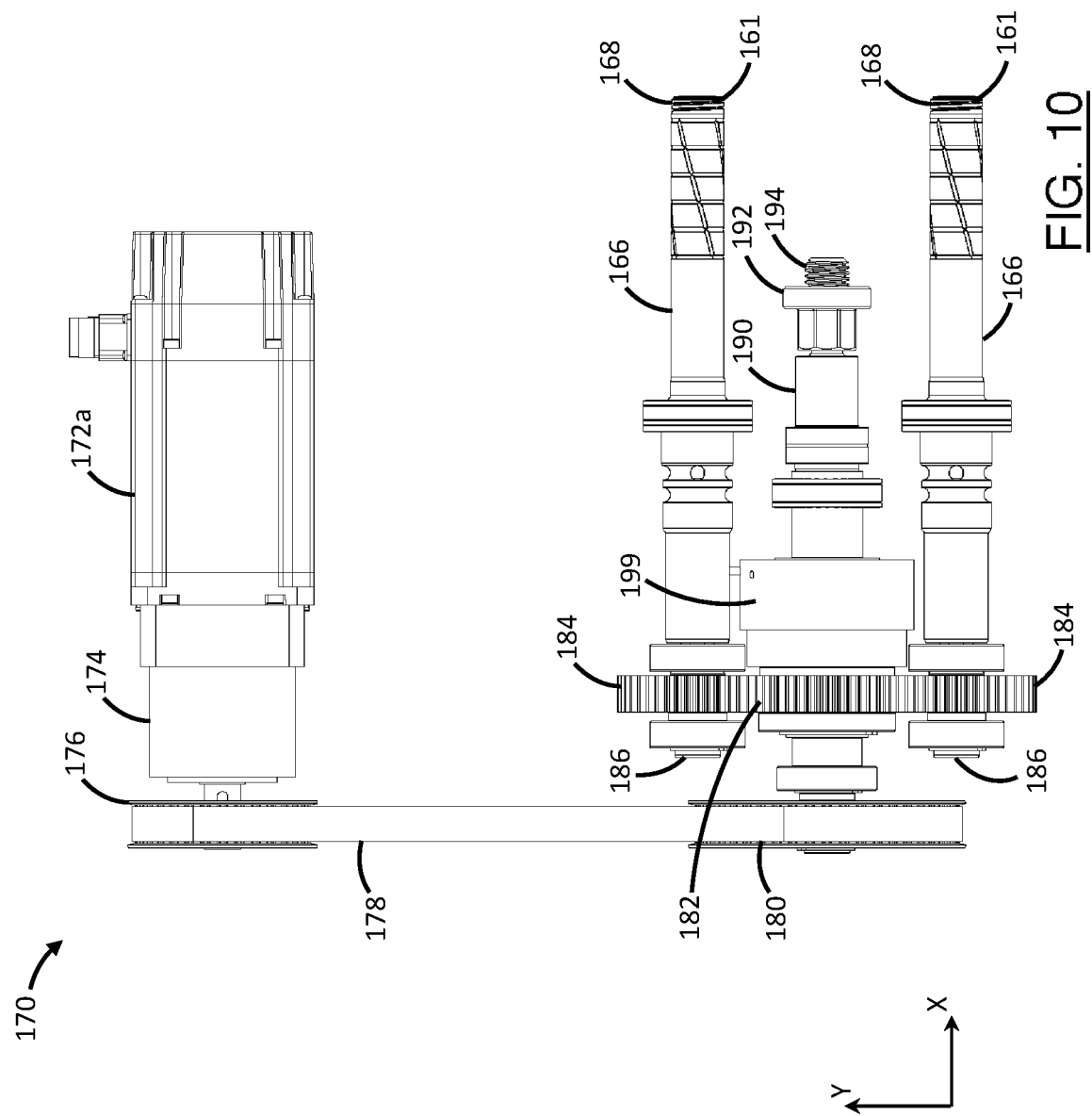
FIG. 10 is a side elevation view from the operator side of the drive mechanism of FIG. 9.

Referring to FIG. 10, in the example illustrated, the drive shaft 190 includes a mechanical actuator in the form of a lead nut 192 coupled to a lead screw 194. As will be described in more detail below, the lead nut 192 and the lead screw 194 operate to translate the second core plate 152 between the second-plate retracted position and the second-plate advanced position in response to being energized through rotation of the drive shaft 190. In some examples, the lead screw 194 may be a ball screw having a threaded shaft that provides a helical raceway for ball bearings, and the lead nut 192 may be a ball nut housing the ball bearings.

In the example illustrated, the drive shaft 190 and the core rods 166 are mechanically linked via meshing between the center gear 182 and the spur gears 184. As a result, operating the first motor 172*a* rotates the drive shaft 190 to translate the second core plate 152 (and thus the core second portion 162) relative to the core first portions 161 while simultaneously rotating the core first portions 161 relative to the second core plate 152 (and thus the core second portion 162). The mechanical linkage synchronizes the advancement of the second core plate 152 and rotation of the core first portions 161 during the ejection phase to unscrew the thread mold 168 of the core first portion 161 from the article first portion 121 without damaging the internal threads 128 of the article first portion 121.

In the example illustrated, a clutch 199 is arranged between and couples the center gear 182 and the drive shaft 190. In the example illustrated, the clutch 199 is an electromagnetic clutch. The clutch 199 can be operated in an adjustment mode to decouple the first motor 172*a* and the drive shaft 190, by breaking the mechanical linkage between the drive shaft 190 and the center gear 182. When the clutch 199 is in the adjustment mode, the first motor 172*a* operates to rotate the core first portions 161 without rotating the drive shaft 190, and therefore without energizing the lead nut 192 and the lead screw 194 to translate the second core plate 152. Thus, when the clutch 199 is in the adjustment mode, the first motor 172*a* operates to rotate the core first portions 161 while the second core plate 152 remains axially fixed relative to the base plate 150.

Rotating the core first portions 161 while the second core plate 152 remains axially fixed relative to the base plate 150 allows for adjustment of a rotational home position of the core first portions 161. The rotational home position can be defined by an angular position of a thread start of the thread mold 168 about the core rod axes 167.

The rotational home position can be adjusted to precisely orient the angular position of the thread start of the thread mold 168 relative to the core second portion 162. Doing so can allow for orientation of the angular position of the thread start 129 of the molded article 120 relative to a reference point of the molded article 120, such as the midpoint of the hinge 123. Such adjustment may assist proper alignment of the dispensing orifice 124 and the hinge 123 of the molded article 120 relative to a container onto which the molded article 120 will be installed. The rotational home position can also be adjusted to correct or compensate for rotational misalignment of the core first portions 161 relative to the core second portions 162 resulting from extended use or wear of the components of the core-half mold apparatus 106*a*.

In examples in which the first motor 172*a* is a servomotor, the rotational home position of the core first portions 161 may be adjusted with high accuracy. For example, the thread start of the thread molds 168 may be adjusted to within 3 degrees of a desired angular position.

Figure 11:
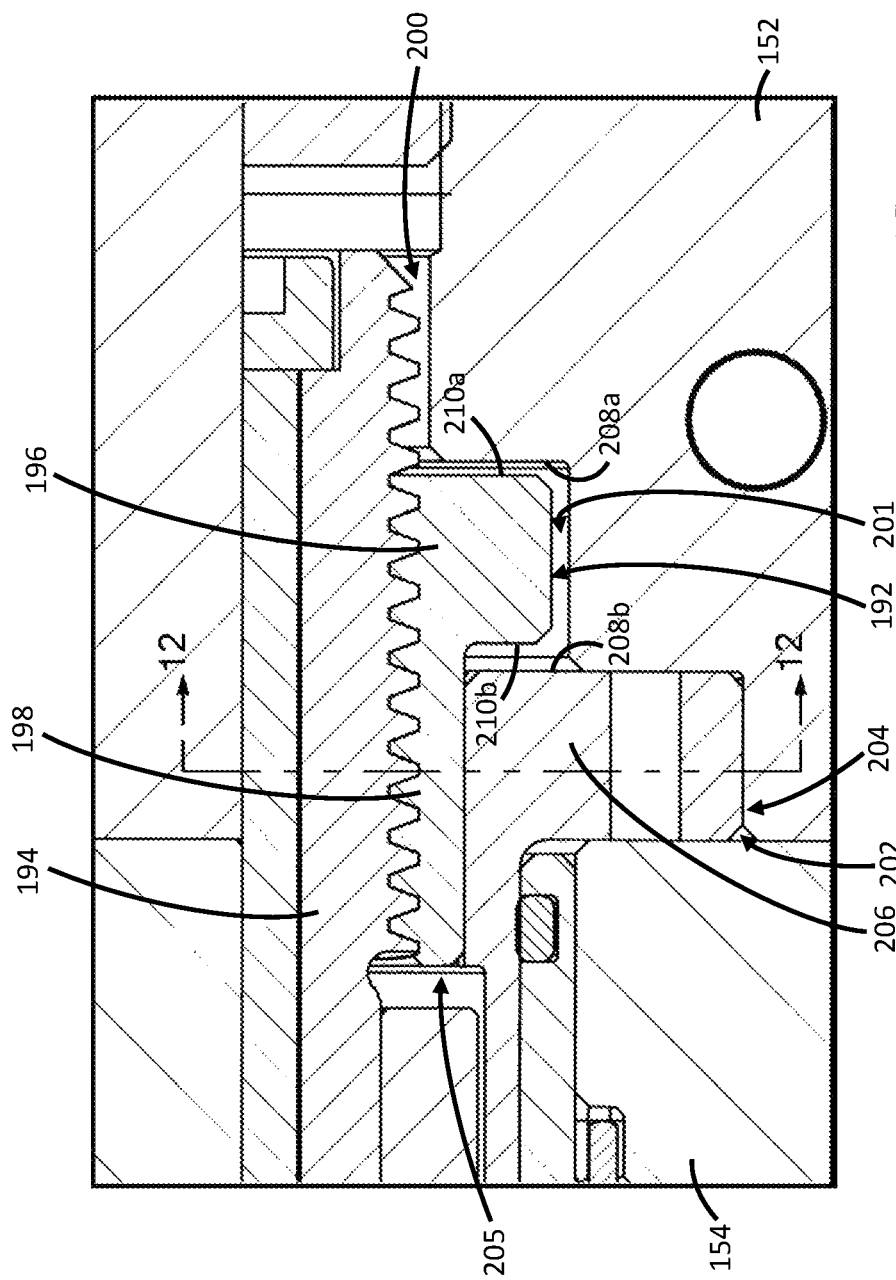
FIG. 11 is a portion of the core-half mold apparatus of FIG. 8, with a second core plate in a retracted position and a lead nut between an advanced and a retracted position.

Referring to FIG. 11, an enlarged portion of FIG. 8 is shown to illustrate the operation of the drive mechanism 170 in axially translating the second core plate 152 during the ejection phase.

In the example illustrated, the lead screw 194 extends through an axial bore 200 formed in the rear face of the second core plate 152. The lead nut 192 is coupled to the lead screw 194. The lead nut 192 can be coupled to the lead screw 194 by being threaded onto the lead screw 194. The lead nut 192 includes a head 196 having a radially outwardly extending flange with axially opposed faces, and a body 198 extending axially away from the lead-nut head 196.

In the example illustrated, a stepped counter bore is formed rearward of and coaxially with the axial bore 200. The stepped counter bore can include a first axial counter bore 201 formed rearward of and coaxially with the axial bore 200, and a second axial counter bore 202 formed rearward of and coaxially with the first axial counter bore 201.

In the example illustrated, the lead-nut head 196 is disposed in the first counter bore 201, and the second core plate 152 includes an annular collar 204 mounted in the second counter bore 202. The collar 204 is rotationally and axially fixed to the second core plate 152.

In the example illustrated, the collar 204 includes a flange 206 that partially radially encloses the first counter bore 201 to retain the lead-nut head 196 in the first counter bore 201 between first and second abutment surfaces 208*a*, 208*b*. The first and second abutment surfaces 208*a*, 208*b* are fixed relative to the second core plate 152. In the example illustrated, the first abutment surface 208*a* is defined by a rearwardly facing surface of the second core plate 152 within the first counter bore 201. The second abutment surface 208*b* is defined by a forwardly facing surface of the flange 206 that partially encloses the first counter bore 201 to retain the lead-nut head 196.

In the example illustrated, the axially opposed faces of the lead-nut head 196 include first and second force-transfer surfaces 210*a*, 210*b*, respectively. The first force-transfer surface 210*a* is directed toward and engageable with the first abutment surface 208*a*, and the second force-transfer surface 210*b* is directed toward and engageable with the second abutment surface 208*b*.

Figure 12:
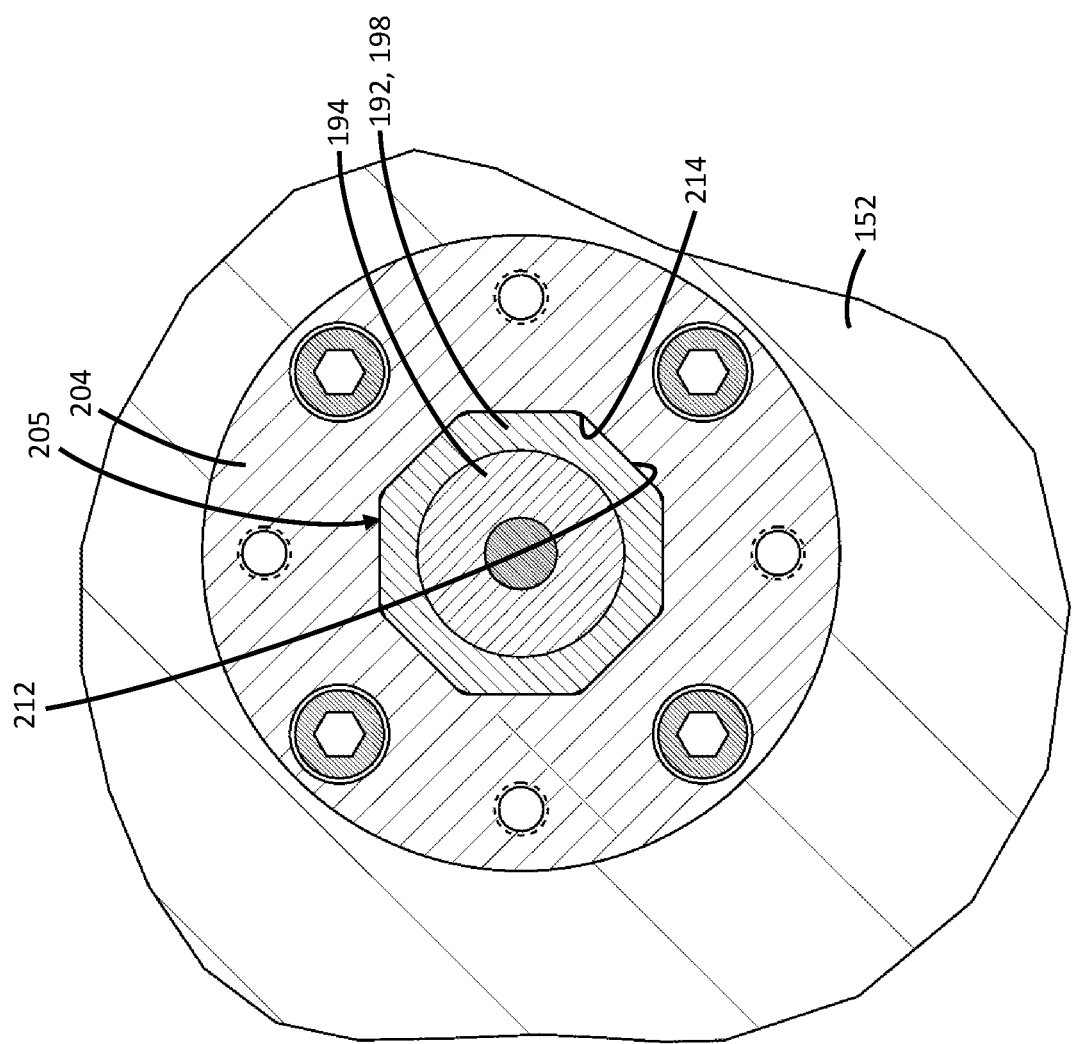
FIG. 12 is a sectional view of the portion of the core-half mold apparatus of FIG. 11 taken along line 12-12 of FIG. 11.

In the example illustrated, the lead-nut body 198 is received through a socket 205 of the collar 204. Referring to FIG. 12, the flat portions of the inner surface of the collar 204 provide anti-rotate surfaces 214 against which corresponding anti-rotate surfaces 212 on the outer surfaces of the lead-nut body 198 can abut. The anti-rotate surfaces 212, 214 engage to rotationally fix the lead nut 192 relative to the second core plate 152. Rotationally fixing the lead nut 192 relative to the second core plate 152 allows the lead nut 192 to axially translate along the length of the lead screw 194 in response to rotation of the lead screw 194 via rotation of the drive shaft 190.

Referring back to FIG. 11, in the example illustrated, the axial dimension of the lead-nut head 196 taken between the first and second force-transfer surfaces 210*a*, 210*b* is less than the axial dimension between the first and second abutment surfaces 208*a*, 208*b*. As a result, in response to rotation of the lead screw 194, the lead nut 192 can axially translate relative to the second core plate 152 between a nut-advanced position and a nut-retracted position.

Figure 13:
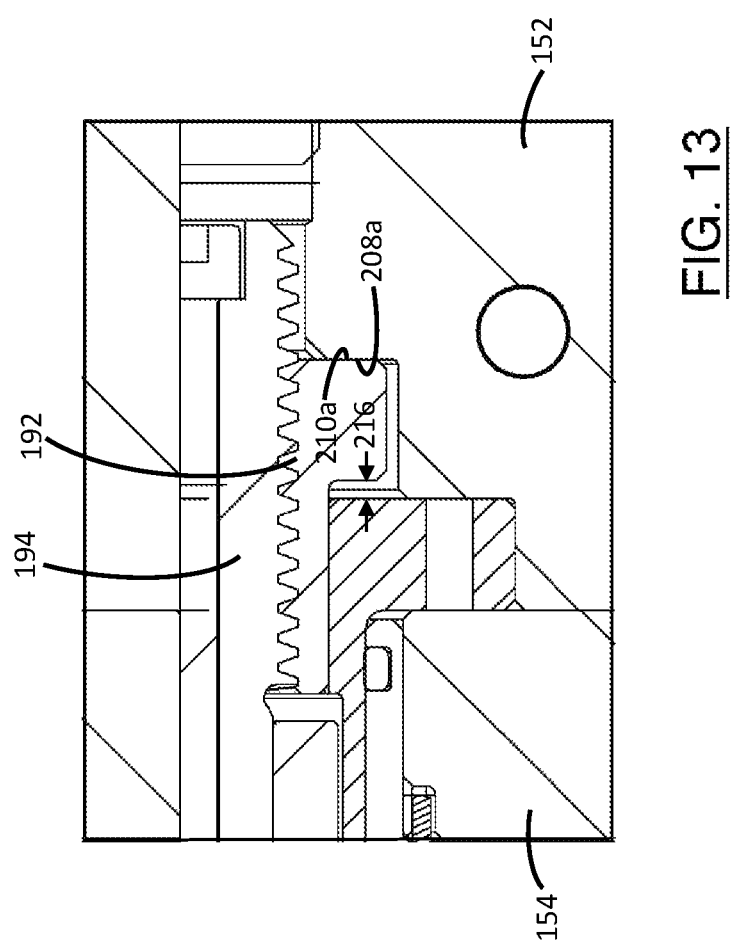
FIG. 13 is the portion of the core-half mold apparatus of FIG. 11, with the second core plate in a retracted position and the lead nut in an advanced position.
Figure 16:
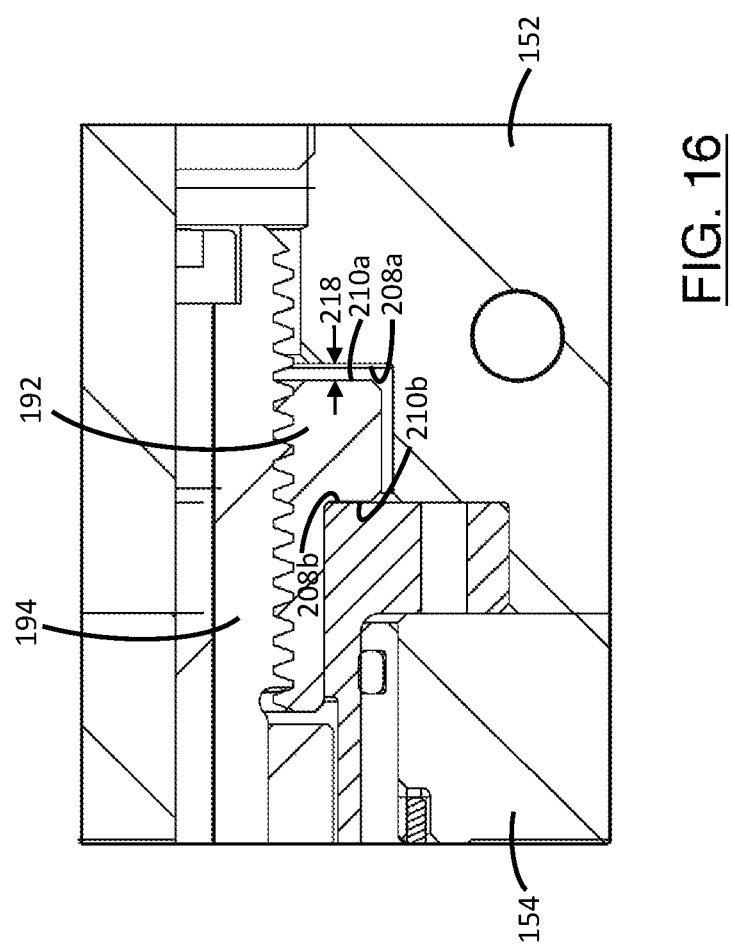
FIG. 16 is the portion of the core-half mold apparatus of FIG. 11, with the second core plate in a retracted position and the lead nut in a retracted position.

In the nut-advanced position, the first force-transfer surface 210*a* of the lead nut 192 bears against the first abutment surface 208*a* of the second core plate 152, and the second force-transfer surface 210*b* is spaced apart from the second abutment surface 208*b* to define a gap 216 (as shown in FIG. 13). In the nut-retracted position, the second force-transfer surface 210*b* of the lead nut 192 bears against the second abutment surface 208*b* of the collar 204, and the first force-transfer surface 210*a* is spaced apart from the first abutment surface 208*a* of the second core plate 152 to define a gap 218 (as shown in FIG. 16). During the ejection phase, the lead nut 192 alternately bears against the first abutment surface 208*a* to move the second core plate 152 to the second-plate advanced position, and the second abutment surface 208b to move the second core plate 152 to the second-plate retracted position.

The axial stroke length (travel) of the lead nut 192 when translating between the nut-advanced position and the nut-retracted position can be defined by the difference between (1) the axial distance between the first and second force-transfer surfaces 210a, 210b and (2) the axial distance between the first and second abutment surfaces 208a, 208b. In some examples, the stroke length of the lead nut 192 is between 1-2 mm. In other examples, the stroke length is less than 1 mm. In the example illustrated, the stroke length is approximately three quarters of a mm.

The operation of the drive mechanism 170 in axially translating the second core plate 152 during the ejection phase of an injection molding cycle will now be described.

Referring to FIG. 13, the second core plate 152 is shown in the second-plate retracted position and the lead nut 192 is shown in the nut-advanced position. The first controller 173a can operate the first motor 172a to drive the drive shaft 190 and rotate the lead screw 194 in a forward rotary direction. In response to rotation of the lead screw 194 in the forward rotatory direction, the first force-transfer surface 210a of the lead nut 192 can exert an advancement force against the first abutment surface 208a sufficient to initiate translation of the second core plate 152 in a forward (advancement) direction toward the second-plate advanced position.

Figure 14:
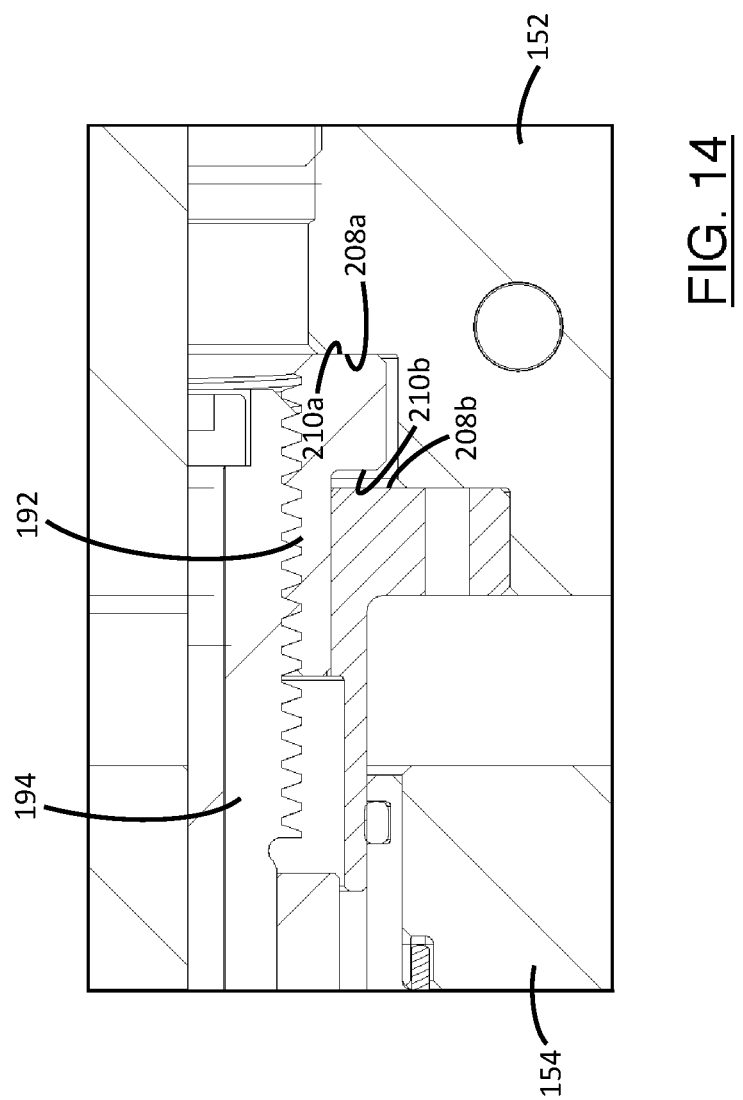
FIG. 14 is the portion of the core-half mold apparatus of FIG. 11, with the second core plate in an advanced position and the lead nut in an advanced position.

Referring to FIG. 14, as the second core plate 152 translates, the lead nut 192 continually exerts an advancement force against the first abutment surface 208a, translating the second core plate 152 to the second-plate advanced position. After the second core plate 152 is translated to the second-plate advanced position, the first motor 172a can drive the lead screw 194 in a reverse rotary direction.

Figure 15:
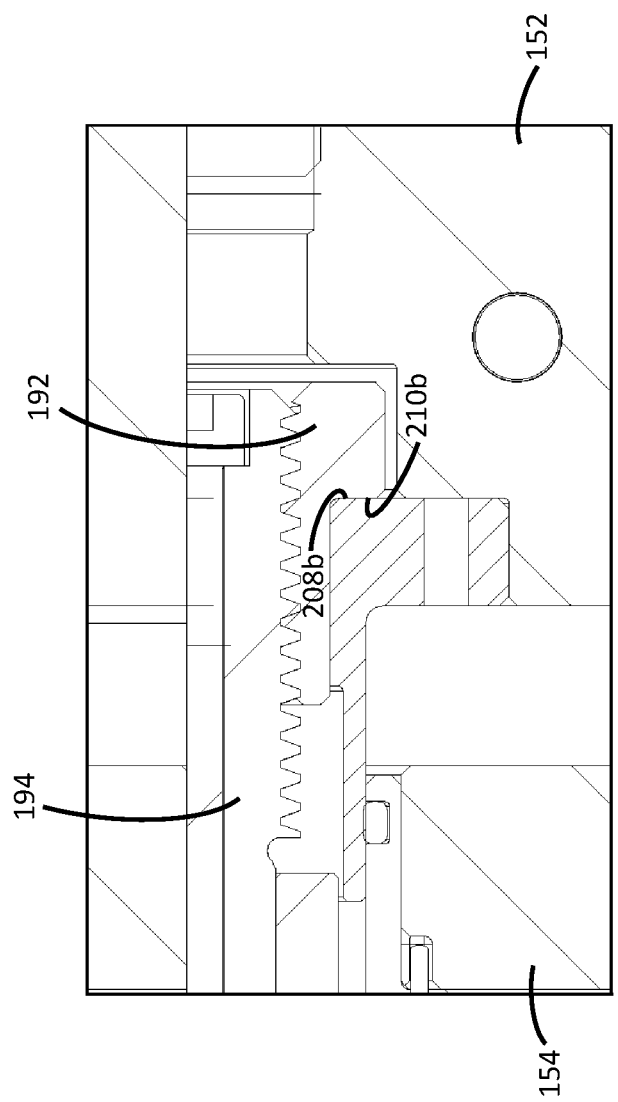
FIG. 15 is the portion of the core-half mold apparatus of FIG. 11, with the second core plate in an advanced position and the lead nut in a retracted position.

Referring to FIG. 15, in response to rotation of the lead screw 194 in the reverse rotatory direction, the second core plate 152 initially remains stationary relative to the base plate 150 as the lead nut 192 translates in a rearward (retraction) direction from the nut-advanced position to the nut-retracted position. Once the lead nut 192 is in the nut-retracted position, the second force-transfer surface 210b of the lead nut 192 can exert a retraction force against the second abutment surface 208b of the collar 204 sufficient to initiate retraction of the second core plate 152 in the rearward direction toward the second-plate retracted position.

Referring to FIG. 16, as the second core plate 152 retracts, the lead nut 192 continually exerts a retraction force against the second abutment surface 208b, translating the second core plate 152 to the second-plate retracted position. In the example illustrated, the second core plate 152 remains in the second-plate retracted position until the mold opens during the next ejection phase of the injection molding process.

After the second core plate 152 reaches the second-plate retracted position, the lead nut 192 may continue to exert a retraction force against the second abutment surface 208b. Relieving the retraction force to axially unload the lead nut 192 and the lead screw 194 can help reduce thread wear. The retraction force can be relieved by axially translating the lead nut 192 in the forward direction away from the second abutment surface 208b and toward the first abutment surface 208a.

In some examples, the first controller 173a can operate the first motor 172a to relieve the retraction force by translating the lead nut 192 into a home position between the nut-retracted position and the nut-advanced position. The home position can be an axial position of the lead nut 192 in which no axial load is transferred across the lead nut threads and the lead screw threads. In some examples, the lead nut 192 may be spaced apart from the second abutment surface 208b when in the home position. In the example illustrated, when in the home position the lead nut is spaced axially away from the second abutment surface and is adjacent to the first abutment surface 208a in unloaded contact. In other words, when in the home position, the lead nut is as far away from the second abutment surface as it can be without generating an axial load across the teeth of the lead nut and lead screw in reaction to pushing against the first abutment surface. The lead nut can translate further forward only in unison with advancement of the second core plate.

The first controller 173a may accurately move the lead nut 192 to the home position by counting the rotational displacement of the shaft of the first motor 172a, which is directly proportional to the axial displacement of the lead nut 192. The axial stroke length of the lead nut as it translates between the first and second abutment surfaces is a fixed, known distance, and the first controller 173a may rotate the shaft of the first motor 172a by an angular distance that precisely corresponds to the stroke length to advance the lead nut 192 from the nut retracted position to the home position. In some examples, the first controller 173a may also monitor the torque output of the first motor 172a to help ensure that the lead nut 192 has not engaged, and is not bearing against, the first abutment surface 208a.

In the example illustrated, having the lead nut in the home position in unloaded contact with the first abutment surface (as described above) can help ensure that when initiating removal of the first core portions from the molded article (i.e when the unscrewing step is initiated), that translation of the second core plate begins simultaneously with the rotation of the core first portions. The presence of an axial gap between the lead nut and the first abutment surface when initiating unscrewing can cause damage to the threaded portion of the molded article, because when the motor is energized, the core first portions will begin rotating immediately, but the second core plate (on which the molded articles are held) will begin translating only after the gap has been taken up (i.e. only after the lead nut has advanced forward to engage the first abutment surface).

A similar problem may exist in some cases, for example if there is wear of the lead nut teeth and/or lead screw teeth, and the lead nut becomes able to translate slightly relative to the lead screw while the lead screw remains in a constant angular (non-rotating) position. This can cause a similar delay in translation of the second core plate after rotation of the core first portions for unscrewing has initiated. When moving in the retraction direction, the back surfaces of the lead screw teeth bear against the front surfaces of the lead nut teeth to retract the lead nut (and the second core plate). Wear between the teeth will present a gap between the front surfaces of the lead screw teeth and the rear surfaces of the lead nut teeth. When changing direction, i.e. advancing the lead nut, such a gap (or backlash) would need to be taken up (by rotating the lead screw) so that the front surfaces of the lead screw teeth bear against the rear surfaces of the lead nut teeth.

In the example illustrated, the "floating nut design" of the lead nut (i.e. the ability of the lead nut to be translated relative to the second core plate) can advantageously be used to mitigate the effect of tooth gap that may be caused by wear. In the example illustrated, when moving the second core plate to the retracted position, the lead nut bears against the second abutment surface and is spaced apart from the first abutment surface. To move the lead nut to the home position, the lead screw is rotated in an advancing direction. This can close the gap at the forward surfaces of the lead screw teeth, after which the lead nut is moved forward to the advanced position. From there, further rotation of the lead screw causes immediate advancement of the lead nut when the unscrewing step is initiated. The additional rotational travel of the motor required to close the tooth gap (when changing from the retraction to the advancement direction) can be added as a precise angular rotation to the angular rotation required to traverse the stroke travel of the lead nut from the second to the first abutment surface.

Furthermore, moving the lead nut to the home position in accordance with the teaching described herein can significantly reduce tooth wear during operation of the mold apparatus. For example, moving the lead nut 192 to the home position prior to closing the mold and applying clamping tonnage can isolate the lead nut 192 and the lead screw 194 from axial forces exerted across the mold during application of clamping tonnage. Isolating the lead nut 192 and the lead screw 194 from the axial forces exerted during application of clamping tonnage may further reduce wear of the threading between the lead nut 192 and the lead screw 194.

Referring to FIG. 14, the advancement force exerted by the lead nut 192 on the first abutment surface 208a may also be relieved prior to retracting the second core plate 152 from the second-plate advanced position. The advancement force can be relieved by axially translating the lead nut 192 in the rearward direction away from the first abutment surface 208a and toward the second abutment surface 208b. In some examples, the first controller 173a operates the first motor 172a to relieve the advancement force and axially unload the lead nut 192 and the lead screw 194 by translating the lead nut 192 away from the first abutment surface 208a.

Figure 17:
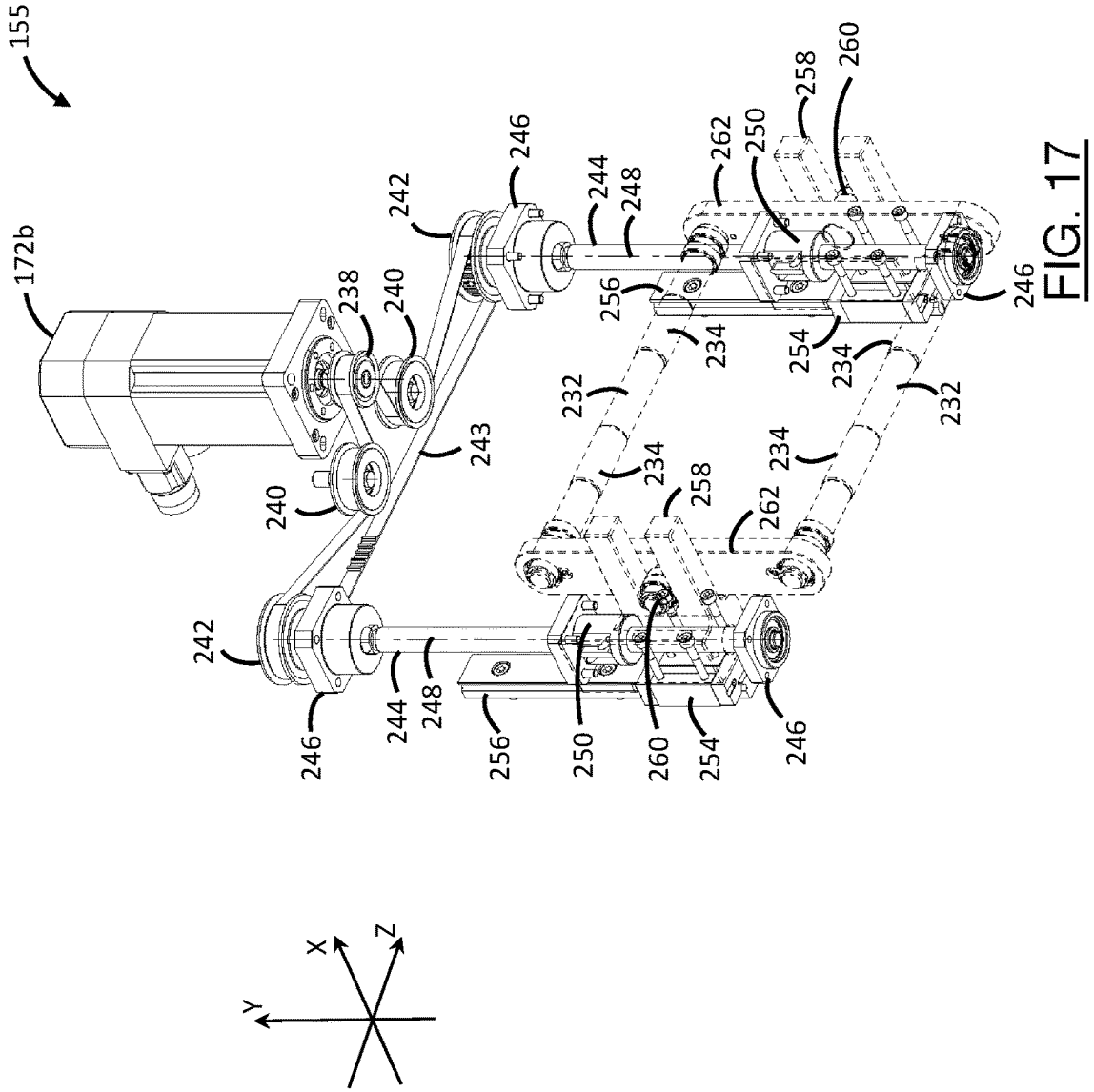
FIG. 17 is a perspective view of a molded-article manipulation mechanism of the core-half mold apparatus of FIG. 6.

Referring to FIG. 17, the manipulation mechanism 155 includes a number of engagement members in the form of rollers 234 supported on movable rods 232. The rollers 234 are movable to engage, pivot, and press the article second portion 122 relative to the article first portion 121 to manipulate the molded article 120 from the biased-open position (FIG. 3A) to the fully-closed position (FIG. 3C) during the ejection phase.

The manipulation mechanism 155 includes a second motor 172b for moving the rollers 234. In the example illustrated, the second motor 172b is a servomotor controllable through a second controller 173b (FIG. 25) to allow for precise control of the position and translation rate of the rollers 234.

Figure 18:
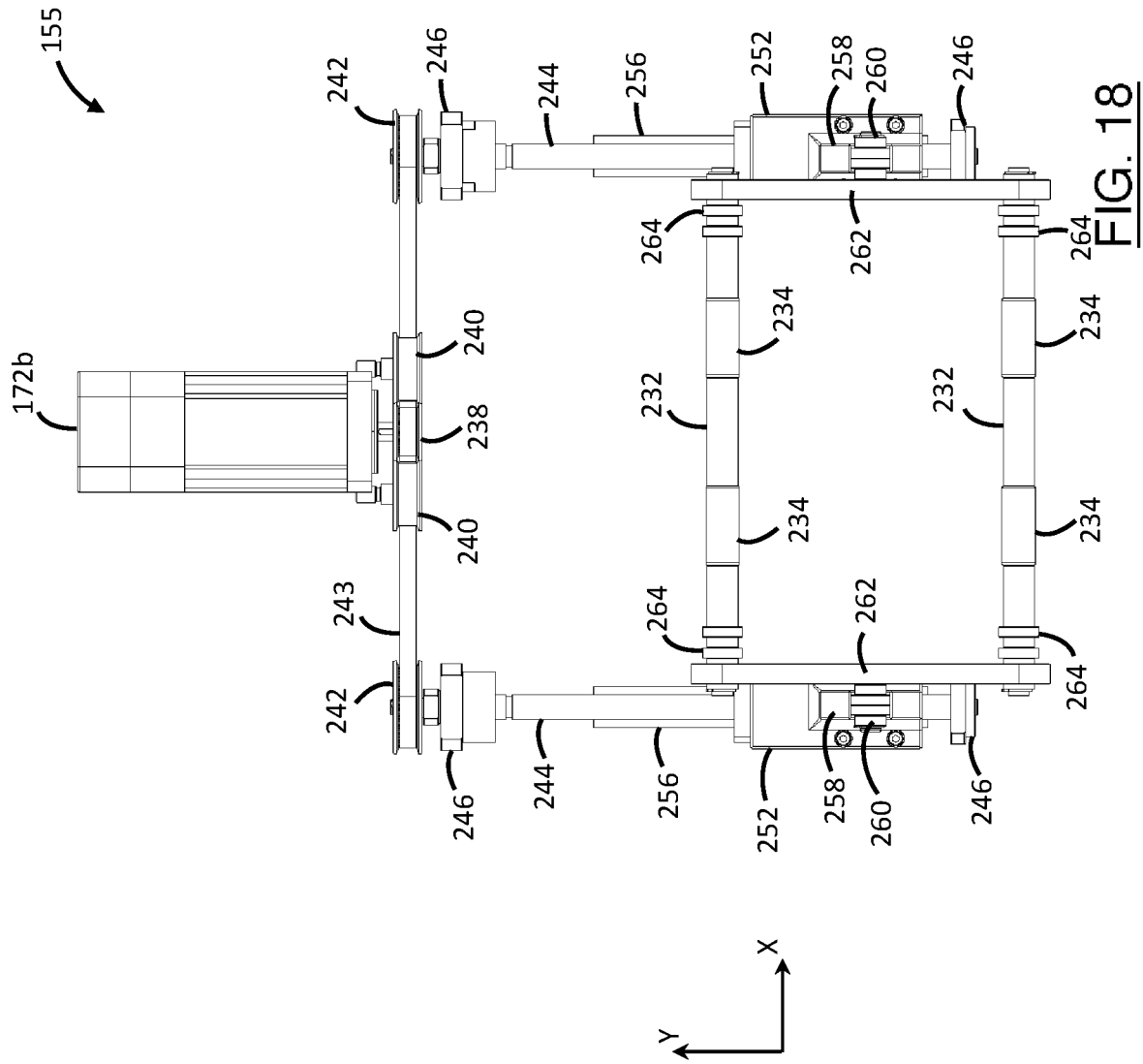
FIG. 18 is a front elevation view of the manipulation mechanism of FIG. 17.

In the example illustrated, the second motor 172b transmits torque to a first timing pulley 238. The first timing pulley 238 is coupled to two idler pulleys 240 and two second timing pulleys 242 through a timing belt 243. Each of the second timing pulleys 242 transmits torque to a respective ball screw shaft 244. The ball screw shafts 244 are supported at laterally opposite ends of the manipulation mechanism 155 by support units 246, and are rotatable about ball screw axes 248. Ball screw nuts 250 are threaded onto the ball screw shafts 244 and retained within respective housings 252 (FIG. 18). Each housing 252 (FIG. 18) is mounted to a respective bearing block 254, which translates along a respective linear rail 256 along the y-axis in response to rotation of the ball screw shafts 244. A generally U-shaped slide 258 is mounted to each of the housings 252 (FIG. 18) and extends forward along the x-axis. Each of the slides 258 retains a bearing 260, which is translatable along the x-axis. A rod link 262 is connected to each of the bearings 260 and extends generally along the y-axis adjacent to the slides 258. The rods 232 extend generally along the z-axis between the rod links 262 and are connected thereto.

Referring to FIG. 18, bearings 264 are fitted at opposite ends of each rod 232, adjacent to the rod links 262. Referring to FIG. 19, the bearings 264 can be received in a respective slot 266 of a cam plate 268. The cam plate 268 operates to guide movement of the rods 232 (and the rollers 234) along a path 270 defined by the slot 266.

The operation of the core-half mold apparatus 106a in manipulating and ejecting the molded article 120 during the ejection phase of an injection molding cycle will now be described.

Referring to FIG. 19, a portion of the core-half mold apparatus 106a is shown shortly after separating from the cavity-half mold apparatus 108a near the start of the ejection phase. The second core plate 152 is shown positioned in the second-plate retracted position. The first core plate 151 is shown translated from the first-plate retracted position to the first-plate advanced position.

Figure 25:
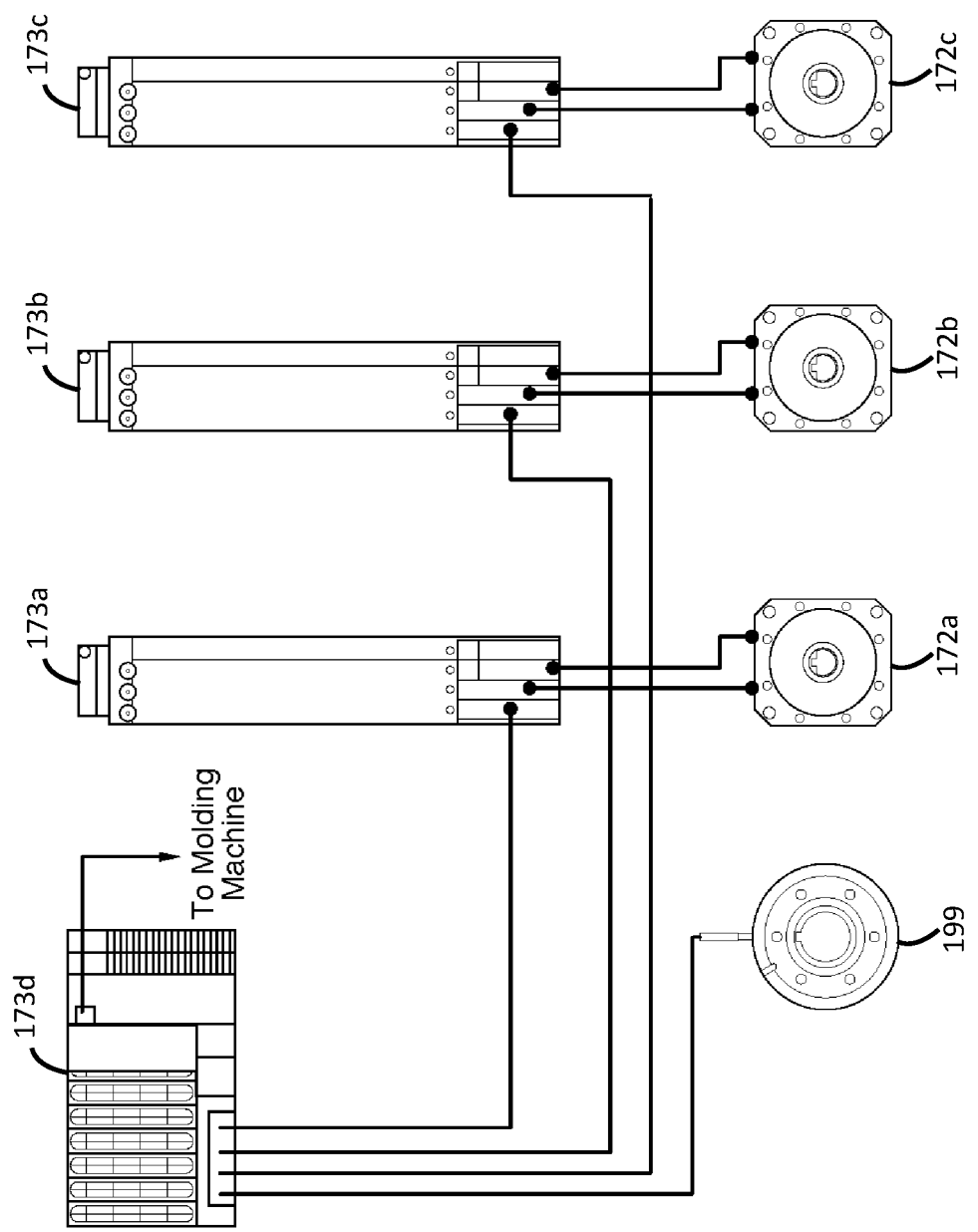
FIG. 25 is a schematic circuit diagram showing connections between elements of the core-half mold apparatus of FIG. 6.

As noted above, the first core plate 151 can be axially translated to the first-plate advanced position through translatable accessory pins that advance and retract the knockout rods 156 (FIG. 8). In some examples, the accessory pins can be driven by a third motor 172c (FIG. 25). In the example illustrated, the third motor 172c is a servomotor controllable through a third controller 173c (FIG. 25) to allow for precise control of the axial position and translation rate of the first core plate 151 and the core rods 166.

Advancing the first core plate 151 translates the core rods 166 and the core first portion 161 to the core-first-portion advanced position shown in FIG. 19. In the core-first-portion advanced position, the core first portion 161 is positioned axially forward of the core second portion 162 when the second core plate 152 is in the second-plate retracted position. Positioning the core first portion 161 axially forward of the core second portion 162 unseats the article second portion 122 from the core second portion 162, and creates an axial gap 272 between the core second portion 162 and the article second portion 122. The axial gap 272 is large enough to accommodate the diameter 274 of the roller 234.

Figure 20:
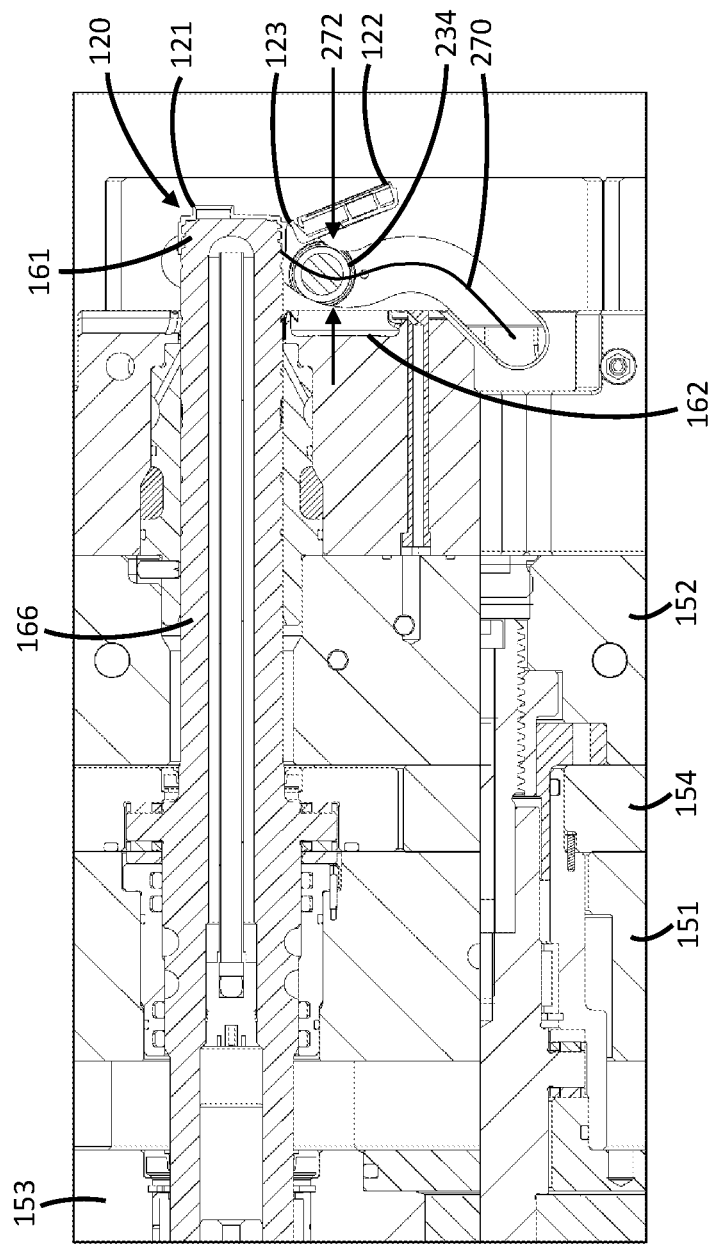
FIG. 20 is the portion of the core-half mold apparatus of FIG. 19, with the first core plate and the first core portion in an advanced position, the second core plate and the second core portion in a retracted position, and the engagement member in an intermediate position.

Referring to FIG. 19, the roller 234 is shown in an engagement-member retracted position, in which the roller 234 is positioned near the bottom of the path 270, clear of the core first portion 161 and the core second portion 162. In some examples, after the axial gap 272 is created, the second motor 172b can operate to move the roller 234 along the path 270 from the engagement-member retracted position to an engagement-member intermediate position between the engagement-member retracted position and the engagement-member advanced position. Referring to FIG. 20, the roller 234 is in the engagement-member intermediate positon, overlying the core second portion 162, and axially rearward of the article second portion 122.

In some examples, cycle time can be minimized by simultaneously operating the second motor 172b and the third motor 172c to synchronize advancement of the core first portion 161 with movement of the roller 234 toward the engagement-member intermediate position.

Figure 21:
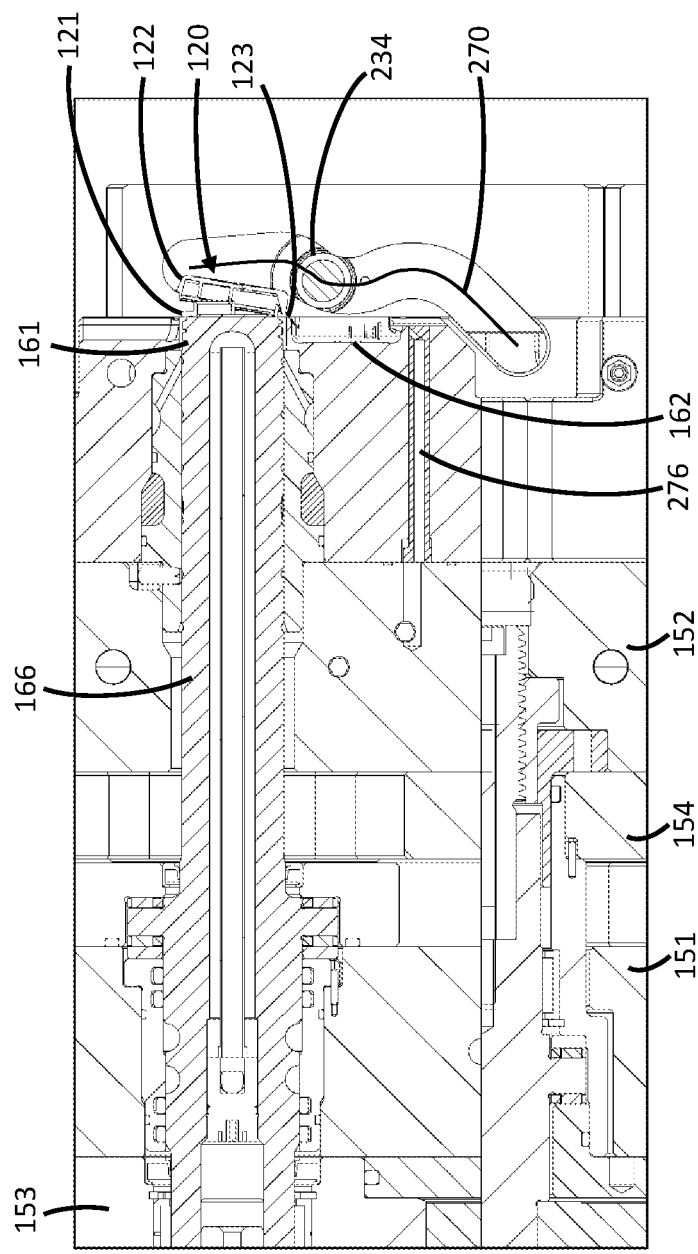
FIG. 21 is the portion of the core-half mold apparatus of FIG. 19, with the first core plate and the first core portion in a retracted position, the second core plate and the second core portion in a retracted position, and the engagement member in an intermediate position.

Referring to FIG. 21, once the roller 234 is positioned in the engagement-member intermediate position, the third motor 172c operates to retract the first core plate 151, thereby translating the core first portion 161 from the core-first-portion advanced position to the core-first-portion retracted position. As the core first portion 161 retracts, so does the molded article 120 as a result of being threaded thereon. Because the roller 234 is positioned in the retraction path of the article second portion 122, the article second portion 122 engages the roller 234, forcing the article second portion 122 to pivot about the hinge 123 into the biased-closed position. Optionally, to assist in overcoming the initial open bias of the article second portion 122, a burst of pressurized air may be directed by a conduit 276 toward the article second portion 122.

Referring to FIG. 22, once the core first portion 161 is retracted and clear of the path 270, the second motor 172b operates to move the roller 234 toward an engagement-member advanced position near the top of the path 270, to move the article second portion 122 to the fully closed position relative to the article first portion 121. In the example illustrated, the roller 234 is shown in the engagement-member advanced position, in which the roller 234 overlies the core first portion 161 and presses against the article second portion 122 with sufficient force to fully-close the molded article 120.

As the roller 234 moves from the engagement-member intermediate position to the engagement-member advanced position, the first motor 172a operates to initiate a process of unscrewing the thread mold 168 of the core first portion 161 from the article first portion 121 to eject the molded article 120. To minimize cycle time, the unscrewing process and movement of the roller 234 form the engagement-member intermediate position to the engagement-member advanced position can occur simultaneously.

Continuing to refer to FIG. 22, the article first portion 121 is shown unscrewed from the thread mold 168 of the core first portion 161. The unscrewing process is initiated by operating the first motor 172a to axially advance the core second portion 162 relative to the core first portion 161 through advancement of the second core plate 152 while synchronously rotating the core first portion 161 relative to the core second portion 162.

During the unscrewing process, the molded article 120 can remain rotationally fixed relative to the core second portion 162. In some examples, the ribs 127 (FIG. 2A) of the article first portion 121 engage a rib element of the core portion 160 to rotationally fix the molded article 120 relative to the core second portion 162. Thus, advancing the core second portion 162 through advancement of the second core plate 152 at a translation rate corresponding to the rotation rate of the core first portion 161 can allow the molded article 120 to be advanced off the thread mold 168. In some examples, the core second portion 162 can be advanced relative to the core first portion 161 at an axial translation rate (i.e., mm/s) equal to the lead of the thread mold 168 multiplied by the revolution rate (i.e., revolutions/s) of the core first portion 161. The lead can be defined as the axial advance of a thread during one revolution (i.e., mm/revolution).

In some examples, the thread mold 168 and the lead screw 194 may have a generally equivalent lead so that the lead screw 194 and the core first portions 161 can be rotated by the first motor 172a at the same rate to unscrew the thread mold 168 from the molded article 120.

In other examples, the lead of the thread mold 168 and the lead screw 194 may be different. In such cases, the center gear 182 and the spur gears 184 (FIG. 9) can be sized to synchronize the axial advancement of the core second portion 162 with the rotation of the core first portions 161. For example, if the lead of the thread mold 168 is equal to half the lead of the lead screw 194, then the spur gears 184 can be sized relative to the center gear 182 to double the rotational speed of the core first portions 161 relative to the rotational speed of the lead screw 194.

In some examples, the second motor 172b can operate during the unscrewing process to dynamically reposition the roller 234 along the path 270 between the engagement-member intermediate position and the engagement-member advanced position. The second motor 172b may operate to move roller 234 to make multiple passes along the path 270, to repeat a movement over a specific portion along the path 270, to stop and start movement along the path 270, etc.

For example, the roller 234 can be moved during a first time along a first portion of the path 270 that includes the engagement-member advanced position. Prior to ejection of the molded article 120, the roller 234 can be moved a second time along the same first portion of the path 270 to, for example, ensure that the article second portion 122 is pressed firmly against the article first portion 121 in the fully closed position. In some examples, the roller 234 can be moved along the first portion of the path 270 the first time and the second time while the core second portion 162 is advancing relative to the core first portion 161 during the unscrewing process.

Figure 23:
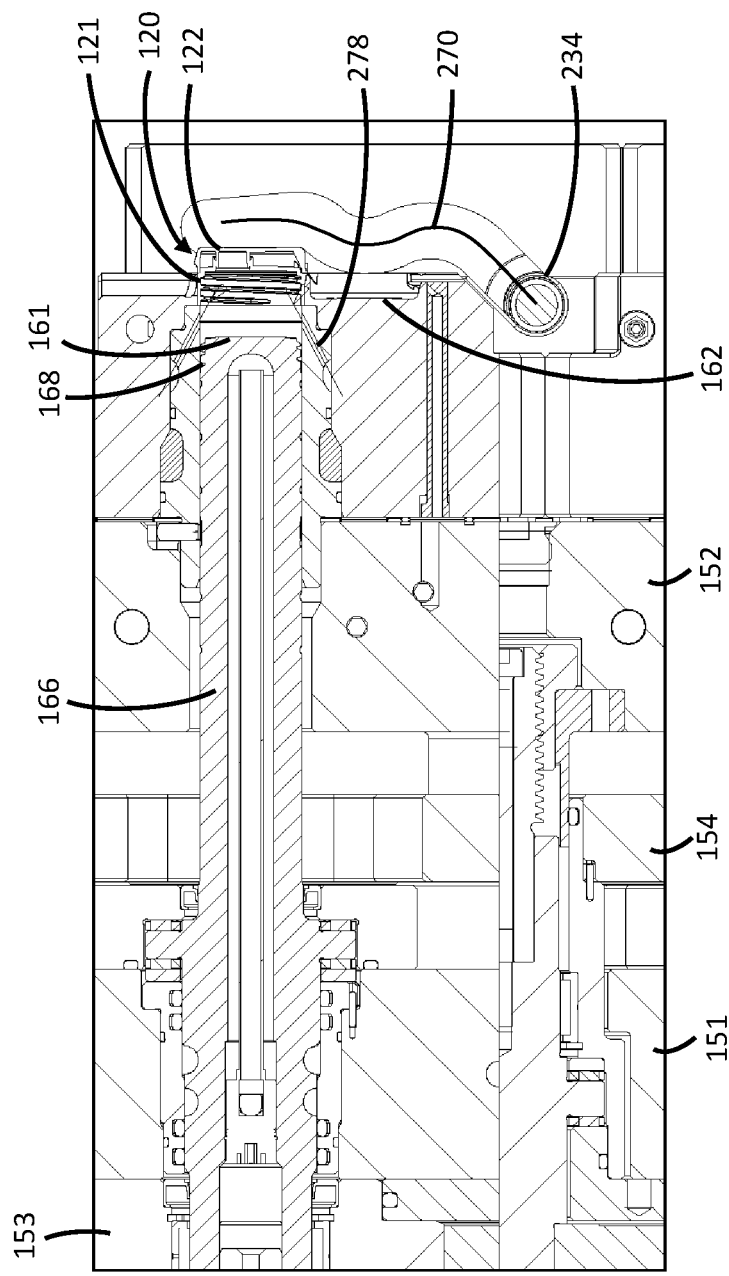
FIG. 23 is the portion of the core-half mold apparatus of FIG. 19, with the first core plate and the first core portion in a retracted position, the second core plate and the second core portion in an advanced position, and the engagement member in the retracted position.

Referring to FIG. 23, after the molded article 120 is fully-closed and the thread mold 168 is unscrewed, the second motor 172b can operate to return the roller 234 to the engagement-member retracted position, at which point the molded article can be ejected. To assist with ejecting the molded article 120, a burst of pressurized air may be directed by one or more conduits 278 toward the molded article 120.

Figure 24:
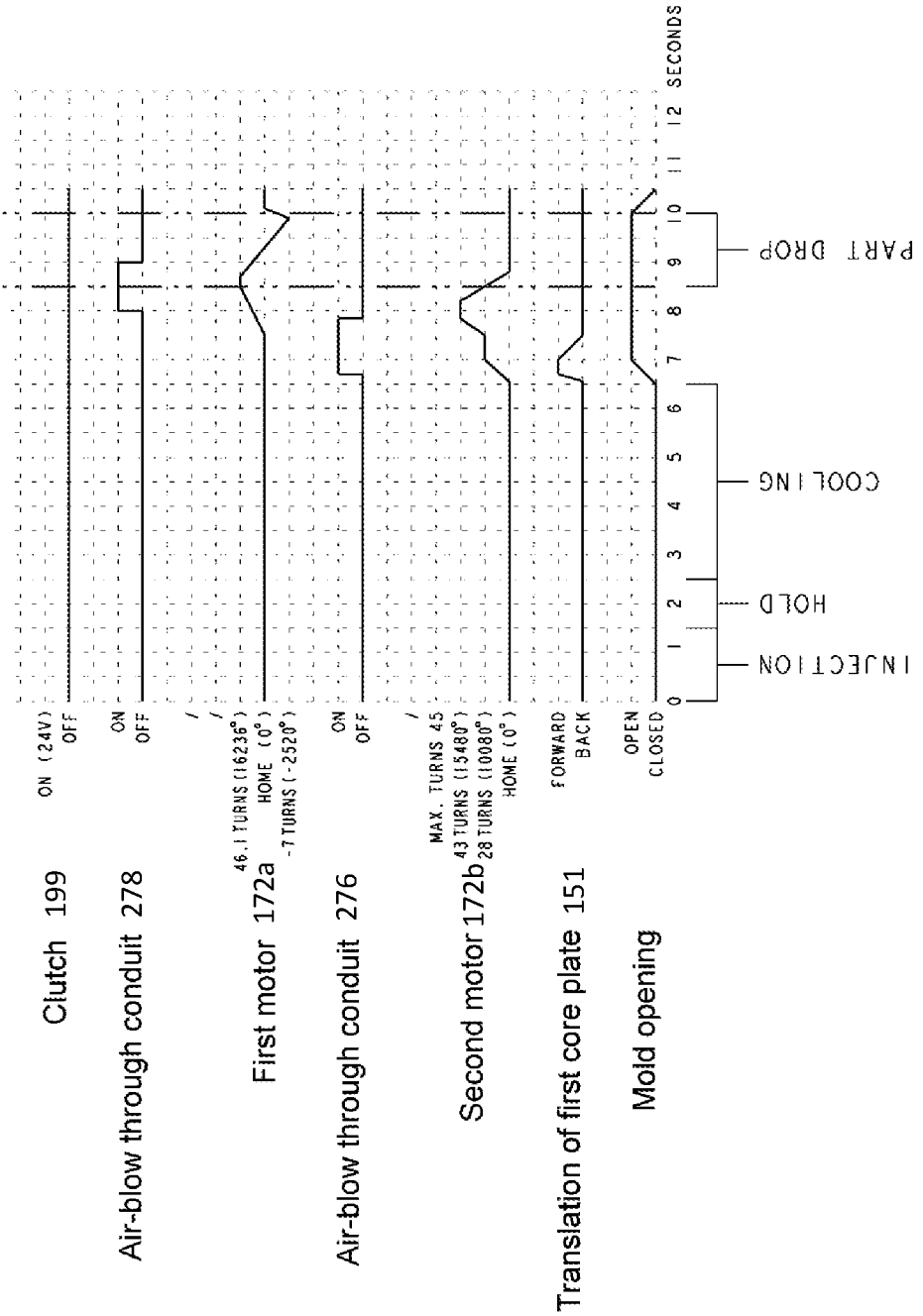
FIG. 24 is a sequence diagram of various functions of the injection molding machine of FIG. 1A during an example injection molding cycle.

Referring to FIG. 24, a sequence diagram illustrating aspects of an example injection molding cycle is shown. The clutch 199 is shown in an off mode for the entirety of the illustrated cycle. This is because, generally, the clutch 199 is used only when the rotational home position of the core first portion 161 requires adjustment (i.e., the angular position of the thread start of the thread mold 168 needs to be adjusted).

Referring to FIG. 25, the motors 172a, 172b, and 172c are shown connected to the controllers 173a, 173b, and 173c, respectively. In examples in which the motors 172a, 172b, and 172c are servomotors, each of the controllers 173a, 173b, 173c may be a dedicated controller configured to monitor and precisely control operational parameters of the motors 172a, 172b, 172c, respectively, including angular position, displacement, velocity, and/or acceleration of respective motor shafts; torque output; current; operational load; and other similar operational parameters.

In the example illustrated, the clutch 199 and the controllers 173a, 173b, and 173c are shown connected to a master controller 173d. The master controller 173d can be programmed to monitor and coordinate operation of the motors 172a, 172b, 172c through the controllers 173a, 173b, 173c. The master controller 173d can also be programmed to control and coordinate operation of the clutch 199, as well as other aspects of the injection molding machine 100 necessary to carry out the injection molding process, including, for example, the injection molding process depicted in FIG. 24. In some examples, one of the controllers 173a, 173b, and 173c may control operation of the clutch 199 in place of the master controller 173d.

Each of the controllers 173a, 173b, 173c, and 173d may include one or more of sensors for monitoring operational parameters of a respective motor and/or other aspects of the injection molding process; memory for storing programmed sequences and instructions; and a user interface. Each of the controllers 173a, 173b, 173c, and 173d may be implemented on a processing device, including, for example, a programmable logic controller (PLC), a microprocessor or a microcontroller, a central processing unit (CPU), a processing module having one or more processing units, a digital signal processor (DSP), a field programmable gate array (FPGA), an application-specific integrated circuit (ASIC), and the like.

While the above description provides examples of one or more apparatuses, methods, or systems, it will be appreciated that other apparatuses or methods may be within the scope of the accompanying claims.

We claim:

1. A mold apparatus for producing a molded article by injection molding, the mold apparatus comprising:
   a) a base plate for mounting to a platen of an injection molding machine;
   b) a core plate movably coupled to the base plate and axially translatable relative to the base plate between a plate advanced position and a plate retracted position;
   c) a core second portion mounted to the core plate for forming a portion of a mold cavity for receiving injection molding material to form the molded article;
   d) a lead screw rotatably supported by, and axially fixed relative to, the base plate; and
   e) a lead nut coupled to the lead screw and rotationally fixed relative to the core plate, the lead nut translatable in response to rotation of the lead screw between a first abutment surface and a second abutment surface, each of the first and second abutment surfaces fixed with respect to the core plate, the lead nut alternately bearing against the first abutment surface for moving the core plate to the plate advanced position and the second abutment surface for moving the core plate to the plate retracted position.

2. The apparatus of claim 1, wherein the lead nut comprises a first force-transfer surface directed toward and engageable with the first abutment surface and a second force-transfer surface directed toward and engageable with the second abutment surface.

3. The apparatus of claim 2, wherein the lead nut comprises a head having a radially outwardly extending flange with axially opposed faces comprising the first and second force-transfer surfaces, respectively.

4. The apparatus of claim 3, wherein the lead nut comprises a first anti-rotate surface engaging a second anti-rotate surface rotationally fixed relative to the core plate to rotationally fix the lead nut relative to the core plate.

5. The apparatus of claim 4, wherein the lead nut comprises a body extending axially away from the head, the body comprising the first anti-rotate surface.

6. The apparatus of claim 5, wherein the core plate comprises a socket receiving the body of the lead nut.

7. The apparatus of claim 6, wherein the core plate comprises an annular collar fixed to the core plate, the collar having an axial end face comprising the second abutment surface and an a radially inner surface at least partially defining the socket and comprising the second anti-rotate surface.

8. The apparatus of claim 1 further comprising:
   a) a core first portion rotatably supported by the base plate, the core first portion comprising a thread mold for forming internal threads of an article first portion of the molded article; and
   b) wherein the core second portion is fixed relative to the core plate and configured for forming an article second portion of the molded article, wherein the core plate is translatable relative to the core first portion, and the core first portion is rotatable relative to the core second portion.

9. The apparatus of claim 8, wherein, during an ejection phase, rotation of the core first portion relative to the core second portion is synchronized with translation of the core plate for unscrewing the core first portion from the article first portion without damaging the internal threads.

10. The apparatus of claim 9 further comprising a first motor operable to simultaneously rotate the lead screw and the core first portion.

11. The apparatus of claim 10 further comprising a clutch operable in an adjustment mode to decouple the first motor and the lead screw so that the core first portion is rotatable by the first motor while the core plate remains axially fixed relative to the base plate.

12. The apparatus of claim 11, wherein, when the clutch is in the adjustment mode, the first motor is operable to rotate the core first portion to adjust a rotational home position of the core first portion while the core plate remains axially fixed relative to the base plate, the rotational home position defined by an angular position of a thread start of the thread mold about an axis of rotation of the core first portion and relative to the core second portion.

13. A mold system for producing a molded article by injection molding, the molded article having an article first portion and an article second portion, the mold system comprising:
   a) a first mold apparatus mountable to a first platen of an injection molding machine;
   b) a second mold apparatus mountable to a second platen of the injection molding machine, the first and second mold apparatuses translatable relative to each other between a mold closed position in which the first and second mold apparatuses enclose at least one cavity for receiving injection molding material to form the molded article, and a mold open position in which the first and second mold apparatuses are spaced apart for ejecting the molded article, the second mold apparatus comprising:
      i) a base plate for attachment to the second platen;
      ii) a core plate carried by and translatable relative to the base plate;
      iii) a core first portion rotatably supported by the base plate, the core first portion comprising a thread mold for forming internal threads of the article first portion;
      iv) a core second portion mounted to the core plate for forming the article second portion;
      v) a drive mechanism comprising a mechanical actuator coupled to the core plate, and a first servomotor for operating the actuator to translate the core plate relative to the base plate between a plate advanced position and a plate retracted position; and
      vi) a manipulation mechanism coupled to the core plate, the manipulation mechanism comprising an engagement member and a second servomotor for moving the engagement member along a path to move the article second portion relative to the article first portion; and
   c) a controller configured to (i) operate the first servomotor to translate the core plate between the plate advanced position and the plate retracted position, and (ii) operate the second servomotor to move the engagement member along the path; wherein the controller is configured to operate the first servomotor to rotate the core first portion in synchronization with the translation of the core plate to correspond to a lead of the thread mold; and wherein the drive mechanism further comprises a clutch coupling the first servomotor and the actuator, and the controller is configured to operate the clutch in an adjustment mode to decouple the first servomotor and the actuator and operate the first servomotor when the clutch is in the adjustment mode to rotate the core first portion while the core plate remains axially fixed relative to the base plate.

14. The system of claim 13, wherein the controller is configured to operate the first servomotor during an ejection phase to translate the core plate between the plate advanced position and the plate retracted position while operating the second servomotor to move the engagement member along the path.

15. The system of claim 14, wherein the controller is configured to operate the first servomotor during the ejection phase to translate the core plate from the plate retracted position to the plate advanced position while operating the second servomotor to move the engagement member along a first portion of the path a first time prior to ejection of the molded article.

16. The system of claim 15, wherein the controller is configured to operate the first servomotor during the ejection phase to move the engagement member along the first portion of the path a second time prior to ejection of the molded article.

17. A mold apparatus for producing a molded article by injection molding, the mold apparatus comprising:
 a) a base plate for mounting to a platen of an injection molding machine;
 b) a core plate movably coupled to the base plate;
 c) a mechanical actuator coupled to the core plate for translating the core plate relative to the base plate between a plate advanced position and a plate retracted position;
 d) a core first portion rotatably coupled to the base plate, the core first portion comprising a thread mold for forming internal threads of the molded article;
 e) a first motor operable to rotate the core first portion relative to the core plate and energize the actuator to translate the core plate in synchronization with rotation of the core first portion to correspond to a lead of the thread mold; and
 f) a clutch coupling the first motor and the actuator, the clutch configured to operate in an adjustment mode to decouple the first motor and the actuator so that the core first portion is rotatable by the first motor while the core plate remains axially fixed relative to the base plate.

18. The apparatus of claim 17, wherein, when the clutch is in the adjustment mode, the first motor is operable to adjust a rotational home position of the core first portion while the core plate remains axially fixed relative to the base plate, the rotational home position defined by an angular position of a thread start of the thread mold about an axis of rotation of the core first portion.

19. A mold for an injection molding machine, comprising:
 a) a first mold apparatus mountable to a first platen of the injection molding machine;
 b) a second mold apparatus mountable to a second platen of the injection molding machine, the first and second mold apparatuses translatable relative to each other between a mold closed position in which the first and second mold apparatuses enclose at least one cavity for receiving injection molding material to form a molded article, and a mold open position in which the first and second mold apparatuses are spaced apart for ejecting the molded article, the second mold apparatus comprising:
  i) a base plate for mounting to the second platen of the injection molding machine;
  ii) a core plate movably coupled to the base plate and axially translatable relative to the base plate between a plate advanced position and a plate retracted position, the core plate including a first abutment surface and a second abutment surface spaced axially apart from and directed toward the first abutment surface;
  iii) a lead screw rotatably supported by, and axially fixed relative to, the base plate; and
  iv) a lead nut coupled to the lead screw and rotationally fixed relative to the core plate, the lead nut translatable relative to the core plate in response to rotation of the lead screw between a nut-advanced position and a nut-retracted position, wherein
 when in the nut-advanced position, the lead nut:
  bears against the first abutment surface for moving the core plate to the plate advanced position, and
  is spaced apart from the second abutment surface; and
 when in the nut-retracted position, the lead nut:
  bears against the second abutment surface for moving the core plate to the plate retracted position, and
  is spaced apart from the first abutment surface.

20. The mold of claim 19, wherein the lead nut is translatable relative to the core plate to a home position axially intermediate the nut-advanced and nut-retracted positions, and in which the lead nut is isolated from axial forces exerted during application of clamping tonnage across the mold.

21. The mold of claim 19, wherein the lead nut has a first force-transfer surface that is in engagement with the first abutment surface when the lead nut is in the nut-advanced position and is spaced apart from the first abutment surface when the lead nut is in the nut-retracted position, and a second force-transfer surface that is in engagement with the second abutment surface when the lead nut is in the nut-retracted position and is spaced apart from the second abutment surface when the lead nut is in the nut-advanced position.

22. The mold of claim 21, wherein the first abutment surface and the second abutment surface are spaced apart by a first axial dimension, and the first force-transfer surface and the second force-transfer surface are spaced apart by a second axial dimension, the second axial dimension less than the first axial dimension to permit axial translation of the lead nut between the first and second abutment surfaces of the core plate.

23. The mold of claim 21, wherein the core plate includes an interior cavity bounded axially by the first abutment surface and the second abutment surface, and wherein the first force-transfer surface is in the cavity and directed toward the first abutment surface and the second force-transfer surface is in the cavity and directed toward the second abutment surface.

24. A mold for an injection molding machine, comprising:
 a) a first mold apparatus mountable to a first platen of the injection molding machine;
 b) a second mold apparatus mountable to a second platen of the injection molding machine, the first and second mold apparatuses translatable relative to each other between a mold closed position in which the first and second mold apparatuses enclose at least one cavity for receiving injection molding material to form a molded article, and a mold open position in which the first and second mold apparatuses are spaced apart for ejecting the molded article, the second mold apparatus comprising:
  i) a base plate for mounting to the second platen of the injection molding machine;
  ii) a core plate movably coupled to the base plate;
  iii) a mechanical actuator coupled to the core plate for translating the core plate relative to the base plate between a plate advanced position and a plate retracted position;
  iv) a core first portion rotatably coupled to the base plate, the core first portion comprising a thread mold for forming internal threads of the molded article;
  v) a first motor operable to rotate the core first portion relative to the core plate and energize the actuator to translate the core plate; and
  vi) a clutch coupling the first motor and the actuator to permit the first motor to drive rotation of the core first portion and energize the actuator simultaneously, the clutch configured to operate in an adjustment mode to decouple the first motor and the actuator so that the core first portion is rotatable by the first motor while the core plate remains axially fixed relative to the base plate.

25. The apparatus of claim 24, wherein, when the clutch is in the adjustment mode, the first motor is operable to adjust a rotational home position of the core first portion while the core plate remains axially fixed relative to the base plate, the rotational home position defined by an angular position of a thread start of the thread mold about an axis of rotation of the core first portion.

* * * * *